(12) United States Patent
Takeoka et al.

(10) Patent No.: US 9,281,123 B2
(45) Date of Patent: Mar. 8, 2016

(54) METALIZED FILM CAPACITOR

(75) Inventors: Hiroki Takeoka, Nara (JP); Yukikazu Ohchi, Osaka (JP); Ryo Majima, Osaka (JP); Yukihiro Shimasaki, Hyogo (JP); Hiroshi Fujii, Toyama (JP); Ryosuke Kamiura, Osaka (JP); Hiroshi Kubota, Toyama (JP); Yasuhiro Hiraki, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/110,893

(22) PCT Filed: May 29, 2012

(86) PCT No.: PCT/JP2012/003482
§ 371 (c)(1),
(2), (4) Date: Oct. 9, 2013

(87) PCT Pub. No.: WO2012/164903
PCT Pub. Date: Dec. 6, 2012

(65) Prior Publication Data
US 2014/0036405 A1    Feb. 6, 2014

(30) Foreign Application Priority Data

May 30, 2011  (JP) ................. 2011-119990
Jun. 15, 2011  (JP) ................. 2011-132974
Jul. 7, 2011   (JP) ................. 2011-150653
Sep. 20, 2011  (JP) ................. 2011-204092

(51) Int. Cl.
*H01G 4/015*   (2006.01)
*H01G 4/008*   (2006.01)
*H01G 4/06*    (2006.01)
*H01G 4/005*   (2006.01)
*H01G 4/18*    (2006.01)

(52) U.S. Cl.
CPC ............... *H01G 4/015* (2013.01); *H01G 4/005* (2013.01); *H01G 4/0085* (2013.01); *H01G 4/18* (2013.01); *Y02T 10/7022* (2013.01)

(58) Field of Classification Search
CPC .......... H01G 4/008; H01G 4/015; H01G 9/15
USPC ........................................ 361/273, 311, 305
See application file for complete search history.

(56) References Cited

U.S. PATENT DOCUMENTS 6,222,721 B1    4/2001  Vetter
6,370,008 B1 *  4/2002  Vetter ......................... 361/273
(Continued)

FOREIGN PATENT DOCUMENTS

EP    2779187      9/2014
JP    9-326328 A   12/1997
(Continued)

OTHER PUBLICATIONS

The Extended European Search Report dated Oct. 6, 2014 for the related European Patent Application No. 12792503.0.
(Continued)

*Primary Examiner* — Eric Thomas
*Assistant Examiner* — Arun Ramaswamy
(74) *Attorney, Agent, or Firm* — McDermott Will & Emery LLP

(57) ABSTRACT

A metalized film capacitor includes metalized films, each of which is formed of an insulating film made of dielectric, and a vapor deposited metal electrode formed on an upper surface of the insulating film. An end of the vapor deposited metal electrode extends together with an end of the insulating film, and both the ends are connected to an electrode terminal. The vapor deposited metal electrode of the metalized film includes a center region and a low resistance section that is made of Al—Zn—Mg alloy. The low resistance section is disposed at an end of the electrode and is thicker than the center region. This metalized film capacitor has high humidity resistance.

2 Claims, 18 Drawing Sheets

(56) References Cited

U.S. PATENT DOCUMENTS

| | | | |
|---|---|---|---|
| 2006/0050467 A1 | 3/2006 | Shiota et al. | |
| 2012/0218679 A1 | 8/2012 | Takeoka et al. | |
| 2014/0009865 A1 | 1/2014 | Takeoka et al. | |
| 2014/0376154 A1 | 12/2014 | Takeoka et al. | |

FOREIGN PATENT DOCUMENTS

| | | |
|---|---|---|
| JP | 2002-504747 A | 2/2002 |
| JP | 2002-164249 | 6/2002 |
| JP | 2004-134561 A | 4/2004 |
| JP | 2004-237512 A | 8/2004 |
| JP | 2005-015848 A | 1/2005 |
| JP | 2006-269727 A | 10/2006 |
| WO | 99/43011 A1 | 8/1999 |
| WO | 2011/055517 | 5/2011 |
| WO | 2011/055517 A1 | 5/2011 |

OTHER PUBLICATIONS

International Search Report for PCT/JP2012/003482 mailed Aug. 7, 2012, 4 pgs.

\* cited by examiner

|  | Example 1 | | | Comparative Example 1 | | |
| --- | --- | --- | --- | --- | --- | --- |
| Changing Rate of Capacitance (%) | -20 | -10 | -5 | -20 | -10 | -5 |
| Changing Rate of Withstanding-Voltage (%) | 0 | -2 | -4 | -5 | -11 | -13 |
| Thickness of Oxide Film (nm) | 0.15 | 0.4 | 5 | 8 | 20 | 30 |

|  | Example 2 | | | Comparative Example 2 | | |
| --- | --- | --- | --- | --- | --- | --- |
| Changing Rate of Capacitance (%) | -20 | -10 | -5 | -20 | -10 | -5 |
| Changing Rate of Withstanding-Voltage (%) | 0 | -2 | -4 | -5 | -11 | -13 |
| Thickness of Oxide Film (nm) | 0.15 | 0.4 | 5 | 8 | 20 | 30 |

FIG. 15A

|  | Example 3 | Example 4 | Example 5 | Comparative Example 3 | Comparative Example 4 | Comparative Example 5 |
|---|---|---|---|---|---|---|
| Average of Concentration of Mg (%) | 1.7 | 4.0 | 5.6 | 1.0 | 2.5 | 4.8 |
| Relative Standard Deviation | 0.2 | 0.025 | 0.051 | 0.8 | 2.77 | 0.68 |
| Decreasing Rate of Capacitance (%) | 4.6 | 0.9 | 0.5 | 8.9 | 4.7 | 3.1 |

FIG. 15B

| Gradient of Potential (V/µm) | 150 | 200 | 250 |
|---|---|---|---|
| Example 3 | 1.3 | 1.28 | 1.29 |
| Comparative Example 4 | 1.24 | 1.21 | 1.08 |

METALIZED FILM CAPACITOR

RELATED APPLICATIONS

This application is the U.S. National Phase under 35 U.S.C. §371 of International Application No. PCT/JP2012/003482, filed on May 29, 2012, which in turn claims the benefit of Japanese Application Nos. 2011-119990, filed May 30, 2011, JP 2011-132974, filed Jun. 15, 2011, JP 2011-150653, filed Jul. 7, 2011 and JP 2011-204092, filed Sep. 20, 2011, the disclosures of which are incorporated by reference herein.

TECHNICAL FIELD

The present invention relates to a metalized film capacitor to be used in various electronic devices, electric apparatuses, industrial equipment, and automobiles, and particularly to a metalized film capacitor suitable to an inverter circuit for driving a motor of a hybrid vehicle, where the capacitor is used for smoothing, filtering, and snubbering.

BACKGROUND ART

In recent years, electric apparatuses have been controlled by an inverter circuit because of environmental protection movement, thereby saving energy, and pursuing higher efficiency. The vehicle industry, among others, has actively developed techniques related to environmental friendly technique, energy saving, and higher efficiency. These techniques put a hybrid vehicle (HEV) that is driven with either an electric motor or an engine, in the market.

An electric motor to be used in HEV is used with a high voltage, several hundreds volts, so that a capacitor to be used therein has electric characteristics, such as high withstanding voltage with low loss. A metalized film capacitor has therefore drawn attention. Since maintenance-free is demanded from the market, the metalized film capacitor that has a long service life has been increasingly employed in this application.

Metalized film capacitors can be separated almost into two groups: a first group employs an electrode made of metal foil; and a second group employs an electrode made of vapor deposited metal formed on dielectric film. The latter group using the electrode made of vapor deposited metal (hereinafter referred to as a vapor deposited metal electrode) has a smaller volume occupied by the electrode than other metalized film capacitors including the metal foil electrode. The latter group can have a small size a light weight. The vapor deposited metal electrode has a self-recovery function in which the vapor deposited metal electrode around a defective portion vaporizes and scatters, so that the capacitor can recover its function. This self-recovery function is generally called a self-healing property. Since the self-recovery function increases the reliability against dielectric breakdown, the metalized film capacitor has been widely employed. A thinner vapor deposited metal electrode invites greater amounts of vapor and scatter, namely the thinner electrode increases the self-healing properties, so that a higher withstanding voltage can be expected.

FIG. 21 is a sectional view of conventional metalized film capacitor 501. FIG. 22 is a plan view of a pair of metalized films of metalized film capacitor 501. Vapor deposited metal electrodes 501a and 501b are formed by vapor-depositing aluminum on one surfaces of dielectric films 502a and 502b made of, e.g. polypropylene except insulating margins 503A and 503B on one ends of dielectric films 502a and 502b, respectively. Zinc is thermally sprayed on other ends of dielectric films 502a and 502b opposite to the one ends, thereby forming sprayed-metal electrodes 504a and 504b. Vapor deposited metal electrodes 501a and 501b are connected to sprayed-metal electrodes 504a and 504b, respectively so that the electrodes can be drawn to the outside.

Vapor deposited metal electrodes 501a and 501b has non-vapor-deposited slits 505a and 505b having no vapor deposited metal electrode thereon made by transferring oil. Electrode 501a is separated into plural electrode segments 506a by slits 505a so that electrodes 506a extend to insulating margin 503a from a center of width W of a center region (effective electrode section) which constitutes a capacitance. Vapor deposited metal electrode 501a is located at an area extending from the center of width W of the effective electrode section toward sprayed-metal electrode 504a, i.e. opposite to insulating margin 503a. Plural electrode segments 506a are connected in parallel to vapor deposited metal electrode 501a with fuses 507a. Electrode 501b is separated into plural electrode segments 506b by slit 505b so that electrodes 506b extend to insulating margin 503b from the center of width W of the center region (effective electrode section) which constitutes a capacitance. Vapor deposited metal electrode 501b is located at an area extending from the center of width W of the effective electrode section toward sprayed-metal electrode 504b, i.e. opposite to insulating margin 503b. Plural electrode segments 506b are connected in parallel to vapor deposited metal electrode 501b with fuses 507b.

Electrode 501a includes low resistance section 508a which is thick locally at an end of electrode 501a contacting sprayed-metal electrode 504a. This structure reduces a connection resistance. Electrode 501b includes low resistance section 508b which is thick locally at an end of electrode 501b contacting sprayed-metal electrode 504b. This structure reduces a connection resistance. After electrodes 501a and 501b are formed, low resistance sections 508a and 508b can be formed by vapor-depositing aluminum or zinc only onto the ends of electrodes 501a and 501b.

Zinc can reduce a melting point of the low resistance section, and hence, increase the adhesion between electrodes 501a and 501b and sprayed-metal electrodes 504a and 504b, accordingly providing metalized film capacitor 501 with a low resistance and high reliability.

Patent Literatures 1-3 disclose conventional metalized film capacitors similar to capacitor 501.

Since the vapor deposited metal electrode is very thin, the vapor deposited metal electrode can be oxidized and deteriorate due to water. An outer package made of resin prevents the water from entering in order to provide humidity resistance.

In recent years, the market demands a metalized film capacitor having a small size, accordingly requiring a thin outer package. The metalized film capacitor mounted particularly into a vehicle is often subjected to harsh environment, e.g. high temperature, high humidity, depending on the mounted locations. Maintaining the high withstanding voltage will entail a thinner vapor-deposited film, accordingly requiring a large humidity resistance.

Conventional metalized film capacitor 501 has the self-healing properties, and reduces heat generation due to fuses 507a and 507b. In other words, a larger current flows in metalized film capacitors 501a and 501b closer to sprayed-metal electrodes 504a and 504b, and a smaller current flows therein farther away from electrodes 504a and 504b. Fuses 507a and 507b, and electrode segments 506a and 506b are disposed closer to insulating margins 503a and 503b toward which the electric current becomes smaller. The heat generated by a current flowing in fuses 507a and 507b can be thus reduced, thereby preventing the temperature rise.

To improve the humidity resistance of metalized film capacitor 501, an alloy can be used as the vapor deposited metal electrode. To be more specific, an alloy made of plural metals, e.g. aluminum, zinc, and magnesium, is used as the electrode for improving the humidity resistance of capacitor 501. For instance, an alloy-electrode mainly made of aluminum with magnesium added thereto reduces water in the film or on the surface of the film due to the reaction shown in formula 1, thereby improving the humidity resistance.

(1)

The electrode made of the alloy thus reduces water that causes leakage current, thereby improving the characteristics of metalized film capacitor 501.

However, it is difficult for metalized film capacitor 501 mounted in a vehicle to obtain enough humidity resistance to the harsh environment although capacitor 501 employs the alloy-electrode.

As metalized film capacitor 501 has a small size, metalized film capacitor 501 entails a thinner film, which causes a lower withstanding voltage accordingly.

CITATION LIST

Patent Literature

Patent Literature 1: Japanese Patent Laid-Open Publication No. 2004-134561
Patent Literature 2: Japanese Patent Laid-Open Publication No. 2005-015848
Patent Literature 3: International Publication WO2011/055517

SUMMARY OF THE INVENTION

A metalized film capacitor includes a metalized film. The metalized film includes an insulating film made of dielectric material and a vapor deposited metal electrode disposed on an upper surface of the insulating film. An end of the first electrode and an end of the insulating film extends together and are connected to the first electrode terminal. The vapor deposited metal electrode includes a center region and a low resistance section made of Al—Zn—Mg alloy disposed at the end of the first electrode. The low resistance section is thicker than the center region. This metalized film capacitor has high humidity resistance.

BRIEF DESCRIPTION OF DRAWINGS

FIG. 15A shows a result of humidity resistance test on a metalized film capacitor in accordance with Exemplary Embodiment 3 of the invention.
FIG. 15B shows an evaluation result of the humidity resistance on the metalized film capacitor in accordance with Embodiment 3.

DETAIL DESCRIPTION OF PREFERRED EMBODIMENTS

Exemplary Embodiment 1

Figure 1:
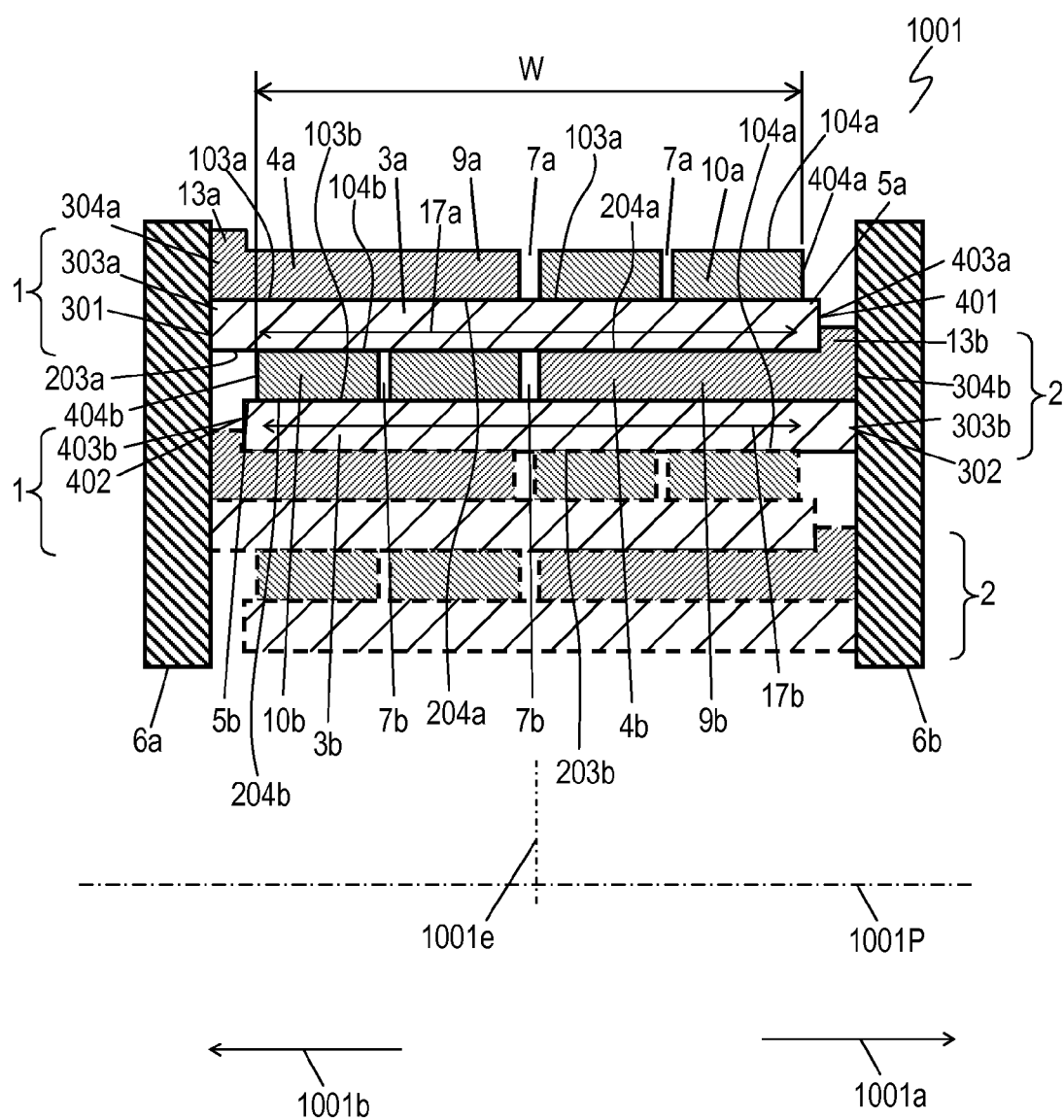
FIG. 1 is a sectional view of a metalized film capacitor in accordance with Exemplary Embodiment 1 of the present invention.

FIG. 1 is a sectional view of metalized film capacitor 1001 in accordance with Exemplary Embodiment 1 of the present invention. Metalized film capacitor 1001 includes metalized films 1 and 2 and electrode terminals 6a and 6b. Metalized film 1 includes insulating film 3a and vapor deposited electrode 4a provided on upper surface 103a of insulating film 3a. Metalized film 2 includes insulating film 3b and vapor deposit metal electrode 4b formed on upper surface 103b of insulating film 3b. According to Embodiment 1 shown in FIG. 1, lower surface 203a of insulating film 3a is situated on upper surface 104b of vapor deposited metal electrode 4b, and metalized film 1 is placed on metalized film 2 such that vapor deposited metal electrode 4a faces vapor deposited metal electrode 4b across insulating film 3a. As shown in FIG. 1, metalized films 1 and 2 stacked together are rolled about center axis 1001P, so that lower surface 203b of insulating film 3b is situated on upper surface 104a of vapor deposited metal electrode 4a, and vapor deposited metal electrode 4a faces vapor deposited metal electrode 4b across insulating film 3a. Metalized film 1 is a metalized film for a positive electrode, and metalized film 2 is a metalized film for a negative electrode. Electrode terminals 6a and 6b are connected to vapor deposited metal electrodes 4a and 4b, respectively. Metalized film 1 and 2 are stacked on each other while being deviated from each other by 1 mm along center axis 1001P for exposing the electrodes to the outside.

According to Embodiment 1, insulating film 3a and 3b are made of dielectric material, such as polypropylene. Vapor deposited metal electrodes 4a and 4b are formed by vapor-depositing the metal, the material of electrodes 4a and 4b, on upper surfaces 103a and 103b of insulating films 3a and 3b, respectively. Metalized film 1 has ends 301 and 401 opposite to each other along center axis 1001P. End 401 is located in direction 1001a from end 301 along center axis direction 1001P. Insulating margin 5a is provided at end 401 for insulating metalized film 1 from metalized film 2. No vapor-deposited metal electrode 4a is provided at insulating margin 5a, so that insulating film 3a is exposed from electrode 4a. Insulating margin 5a has a width of 2 mm along direction 1001a. Metalized film 2 has ends 302 and 402 opposite to each other along center axis 1001P. End 402 is located in direction 1001b opposite to direction 1001a from end 302 along center axis direction 1001P. Insulating margin 5b is provided at end 402 for insulating metalized film 2 from metalized film 1. No vapor-deposited metal electrode 4b is provided at insulating margin 5b, so that insulating film 3b is exposed from electrode 4b. Insulating margin 5b has a width of 2 mm along direction 1001b. Vapor deposited metal electrode 4b may alternatively be formed by vapor-depositing the metal, the material of electrode 4b, on lower surface 203a of insulating film 3a.

Insulating film 3a has ends 303a and 403a opposite to each other along center axis 1001P. End 403a is located in direction 1001a from end 303a. Electrode 4a has ends 304a and 404a opposite to each other along center axis 1001P. End 404a is located in direction 1001a from end 304a. Insulating film 3b has ends 303b and 403b opposite to each other along center axis 1001P. End 403b is located in direction 1001b from end 303b. Vapor deposited metal electrode 4b has ends 304b and 404b opposite to each other along center axis 1001P. End 404b is located in direction 1001b from end 304b.

Vapor deposited metal electrodes 4a and 4b are connected to electrode terminals 6a and 6b, respectively, and extend to an outside of capacitor 1001. According to Embodiment 1, electrode terminal 6a is a sprayed-metal electrode that is formed by thermal-spraying a metal, such as zinc, onto end 301 of rolled metalized film 1, that is, onto ends 304a of vapor deposited metal electrode 4a and end 303a of insulating film 3a. Similarly, electrode terminal 6b is a sprayed-metal electrode that is formed by thermal-spraying a metal, such as zinc, onto end 302 of rolled metalized film 2 wound, that is, onto end 304b of vapor deposited metal electrode 4b and end 303b of insulating film 3b.

Figure 2:
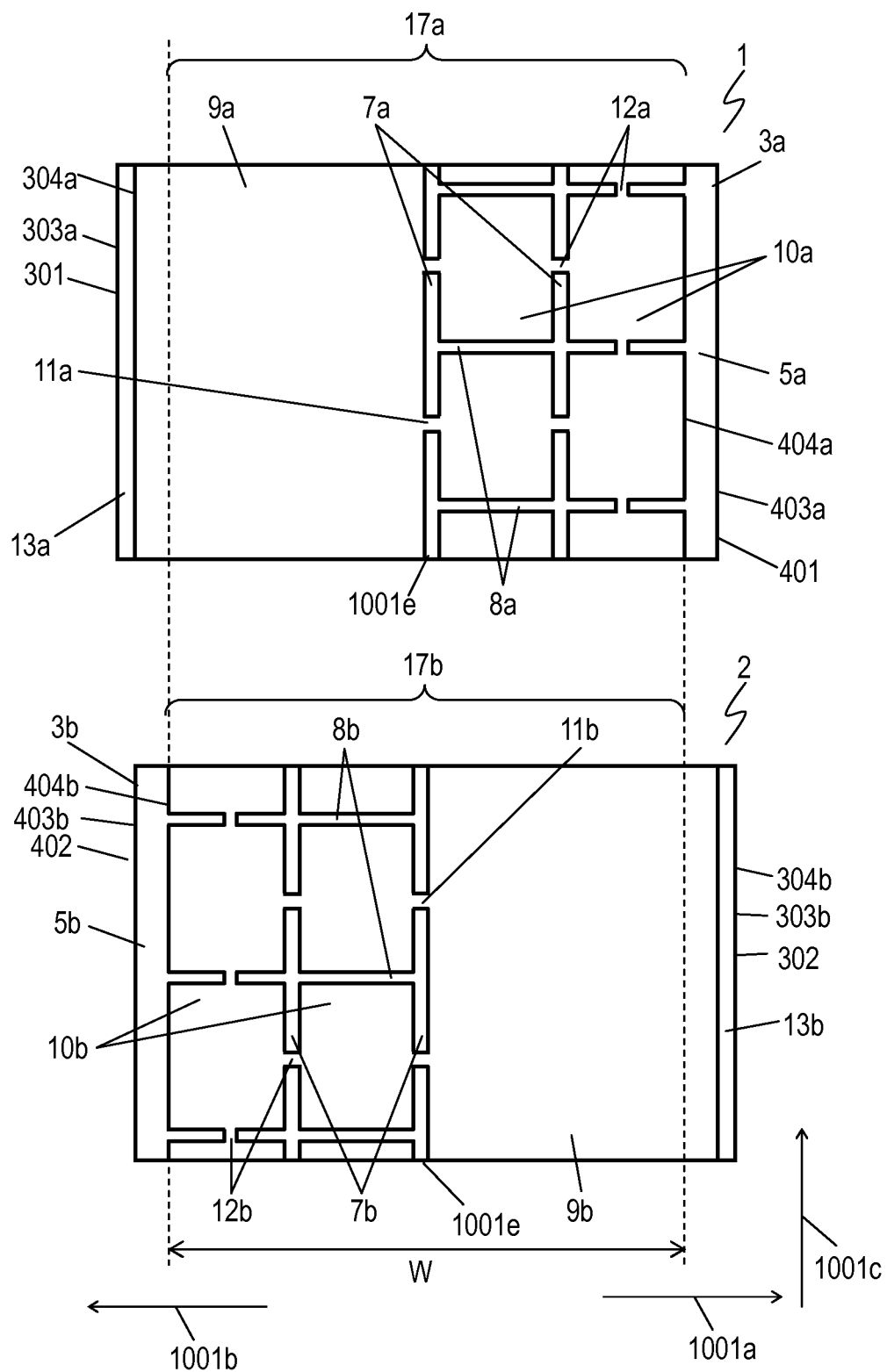
FIG. 2 is a plan view of the metalized film capacitor in accordance with Embodiment 1.

FIG. 2 is a plan view of metalized films 1 and 2. Vapor deposited metal electrode 4a includes center region 17a facing vapor deposited metal electrode 4b across insulating film 3a. Vapor deposited metal electrode 4b includes center region 17b facing vapor deposited metal electrode 4a across insulating film 3b. Center regions 17a and 17b of electrodes 4a and 4b form an effective electrode section that constitutes a capacitance.

Vapor deposited metal electrode 4a has vertical margins 7a and lateral margins 8a which are implemented by slits formed between end 404a and substantial center 1001e of width W along direction 1001a. The margins can be formed by transferring oil onto upper surface 103a of insulating film 3a. No metal, the material of electrode 4a, is vapor-deposited onto vertical margin 7a and lateral margin 8a, so that upper surface 103a of insulating film 3a is exposed from vertical margin 7a and lateral margin 8a. Lateral margin 8a extends along direction 1001a while vertical margin 7a extends along direction 1001c perpendicular to direction 1001a. Margins 7a and 8a separates vapor deposited metal electrode 4a into large electrode segment 9a and plural small electrode segments 10a. Electrode 4a further includes plural fuses 11a and plural fuses 12a. Fuses 11a connect large electrode segment 9a to plural small electrode segments 10a while fuses 12a connect small electrode segments 10a to each other. Large electrode segment 9a is disposed between center 1001e and end 303a, extends to end 303a to be connected to electrode terminal 6a. Plural small electrode segments 10a are disposed between center 1001e and end 403a, and are arranged up to insulating margin 5a.

Plural small electrode segments 10a are connected electrically in parallel to large electrode segment 9a with fuses 11a. Small electrode segments 10a adjacent to each other are connected electrically in parallel with fuses 12a. Small electrode segment 10a has a width along direction 1001a of about ¼ of width W of the effective electrode section. Two small electrode segments 10a are arranged in direction 1001a; however, the configuration is not limited to this, and more than two of small electrode segments 10a may be arranged in direction 1001a.

If short-circuit occurs at a defectively insulated part between vapor deposited metal electrodes 4a and 4b while metalized film capacitor 1001 is used, energy generated by the short-circuit vapors and scatters electrode 4a around the defective insulation, thereby recovering the insulation. This phenomenon is referred to as a self-recovery function of capacitor 1001. When a part between metalized films 1 and 2 is short-circuited, this function allows capacitor 1001 to recover. When a failure in small electrode segments 10a causes a large current to flow into small electrode segments 10a, fuse 11a, or fuse 12a scatters so that an electric connection at the failed small electrode segment 10a is cut off, and the current thus does not flow through the failed small electrode segment 10a. As a result, the electric current in capacitor 1001 can recover.

Similarly to vapor deposited metal electrode 4a, electrode 4b has vertical margin 7b and lateral margin 8b. Margins 7b and 8v are implemented by slits formed between end 404b and substantial center 1001e of width W along direction 1001b (1001a) of center region 17b. Margins 7b and 8b may be formed by transferring oil onto upper surface 103b of insulating film 3b. No metal, the material of electrode 4b, is vapor-deposited onto vertical margin 7b or lateral margin 8b, so that upper surface 103b of insulating film 3b is exposed from margins 7b and 8b. Lateral margin 8b extends in direction 1001b (1001a), and vertical margin 7b extends in direction 1001c. Margins 7b and 8b separate vapor deposited metal electrode 4b into large electrode segment 9b and plural small electrode segments 10b. Electrode 4b further includes plural fuses 11b and plural fuses 12b. Fuses 11b connect large electrode segment 9b to plural small electrode segments 10b while fuses 12b connect small electrode segments 10b to each other. Large electrode segment 9b is disposed between center 1001e and end 303b, and extends to end 303b to be connected to electrode terminal 6b. Plural small electrode segments 10b are disposed between center 1001e and end 403b, and are arranged up to insulating margin 5b.

Plural small electrode segments 10b are connected electrically in parallel to large electrode segment 9b with fuses 11b. Small electrode segments 10b adjacent to each other are connected electrically in parallel with fuses 12b. Small electrode segments 10b of electrode 4b face large electrode segment 9a of electrode 4a across insulating film 3a. Small electrode segments 10a of electrode 4a face large electrode segment 9b of electrode 4b across insulating film 3a.

Electrode segment 10b has a width along direction 1001b (1001a) of about ¼ of width W of the effective electrode section. Two small electrode segments 10b are arranged in direction 1001b (1001a); however, the configuration is not limited to this, and more than two of small electrode segments 10b may be arranged in direction 1001b.

If short-circuit occurs at a defectively insulated part between vapor deposited metal electrodes 4a and 4b while metalized film capacitor 1001 is used, energy generated by the short-circuit vapors and scatters electrode 4b around the defective insulation, thereby recovering the insulation. This phenomenon is referred to as a self-recovery function of capacitor 1001. When a part between metalized films 1 and 2 is short-circuited, this function allows capacitor 1001 to recover. When a failure in small electrode segments 10b causes a large current to flow into small electrode segments 10b, fuse 11b or fuse 12b scatters so that an electric connection at the failed small electrode segment 10b is cut off, and the current thus does not flow through the failed small electrode segment 10b. As a result, the electric current in capacitor 1001 can recover.

Similarly to vapor deposited metal electrode 4a, electrode 4b has vertical margins 7b and lateral margins 8b which are implemented by slits formed between end 404b and substantial center 1001e of width W of center region 17b along direction 1001b (1001a). Margins 7b and 8b can be formed by transferring oil onto upper surface 103b of insulating film 3b. No metal, the material of electrode 4b, is vapor-deposited onto vertical margins 7b and lateral margins 8b, so that upper surface 103b of insulating film 3b is exposed from margins 7b and 8b. Lateral margin 8b extends in direction 1001b (1001a) while vertical margin 7b extends along direction 1001c. Margins 7b and 8b separate vapor deposited metal electrode 4b into large electrode segment 9b and plural small electrode segments 10b. Electrode 4b further includes plural fuses 11b and plural fuses 12b. Fuses 11b connect large electrode segment 9b to plural small electrode segments 10b. Fuses 12b connect small electrode segments 10b to each other. Large electrode segment 9b is disposed between center 1001e and end 303b, and extends to end 303b to be connected to electrode terminal 6b. Plural small electrode segments 10b are disposed between center 1001e and end 403b, and are arranged up to insulating margin 5b.

Plural small electrode segments 10b are connected electrically in parallel to large electrode segment 9b with fuses 11b. Small electrode segments 10b adjacent to each other are connected electrically in to each other parallel with fuses 12b.

Small electrode segment 10b has a width of about ¼ of width W of the effective electrode section along direction 1001b (1001a). Two small electrode segments 10b are arranged along direction 1001b (1001a); however, the configuration is not limited to this, and more than two of small electrode segments 10b can be arranged along direction 1001b.

According to Embodiment 1, vapor deposited metal electrodes 4a and 4b are separated into large electrode segments 9a and 9b and small electrode segments 10a and 10b; however, each of vapor deposited metal electrodes 4a and 4b is not necessarily separated, but remains a single electrode.

According to Embodiment 1, insulating films 3a and 3b are made of dielectric material, such as polypropylene film; however, may be made of other dielectric, materials such as polyethylene-terephthalate, polyethylene-naphthalate, polyphenyle-sulfide, or polystyrene.

As shown in FIG. 1, in metalized film capacitor 1001 in accordance with Embodiment 1, vapor deposited metal electrodes 4a and 4b include low resistance sections 13a and 13b disposed at ends 304a and 304b contacting electrode terminals 6a and 6b, respectively. Low resistance sections 13a and 13b are thicker than center regions 17a and 17b and have smaller resistance than center regions 17a and 17b, respectively. Low resistance sections 13a and 13b are made of alloy containing aluminum, zinc, and magnesium (hereinafter, referred to as Al—Zn—Mg alloy). In metalized film capacitor 1001 in accordance with Embodiment 1, one of vapor deposited electrodes 4a and 4b may not include the low-resistance section.

End 304a of vapor deposited metal electrode 4a extends coincidentally with end 303a of insulating film 3a, and is connected to electrode terminal 6a. Center region 17a is located from end 304a and faces electrode 4b across insulating film 3a. Low resistance section 13a is disposed at end 304a of electrode 4a and is thicker than center region 17a. Low resistance section 13a is made of the Al—Zn—Mg alloy. End 304b of vapor deposited metal electrode 4b extends coincidentally with end 303b of insulating film 3b, and is connected to electrode terminal 6b. Center region 17b is located away from end 304b and faces electrode 4a across insulating film 3b. Low resistance section 13b is disposed at end 304b of electrode 4b and is thicker than center region 17b. Low resistance section 13b is made of the Al—Zn—Mg alloy.

Figure 3:
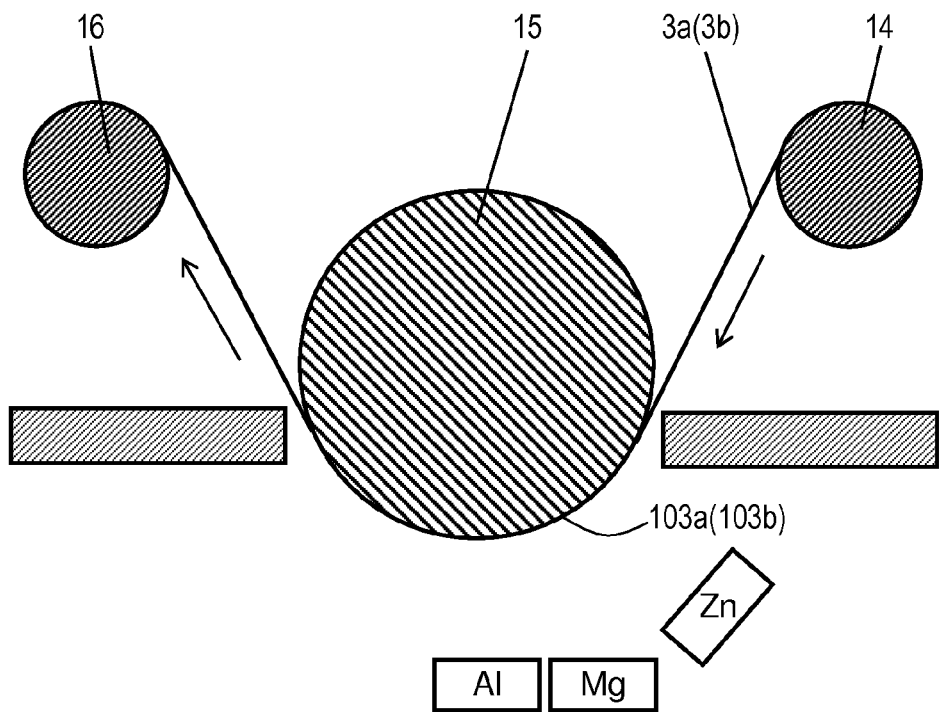
FIG. 3 schematically shows a method for manufacturing the metalized film capacitor in accordance with Embodiment 1.

FIG. 3 is a schematic view of metalized films 1 and 2 for illustrating a method of manufacturing metalized films 1 and 2. In a vacuum deposition device, while insulating films 3a and 3b rolled on roller 14 are moved and attached securely onto drum 15, aluminum, zinc, and magnesium are vacuum-deposited onto upper surfaces 103a and 103b of insulating films 3a and 3b, and then, films 3a and 3b are rolled up on roller 16, thereby providing vapor deposited metal electrodes 4a and 4b.

Examples of metalized film capacitor 1001 in accordance with Embodiment 1 will be described below.

Example 1

Example 1 of Vapor deposited metal electrodes 4a and 4b of the metalized film capacitor include low resistance sections 13a and 13b made of the Al—Zn—Mg alloy.

Vapor deposited metal electrodes 4a and 4b are made of Al—Mg alloy. Insulating films 3a and 3b are made of polypropylene. Insulating film 3a and vapor deposited metal electrode 4a of Example 1 of metalized film capacitor 1 are made of the same materials and by the same method as insulating film 3b and vapor deposited metal electrode 4b of metalized film 2. Metalized films 1 and 2 thus have the characteristics of the metalized film of Example 1 described below.

Magnesium has a smaller standard Gibbs energy of formation per 1 mol of metal-oxygen linkage than aluminum. Magnesium can be thus diffused on a surface of deposited film depending on a degree of vacuum or by oxygen introduction.

Figure 4:
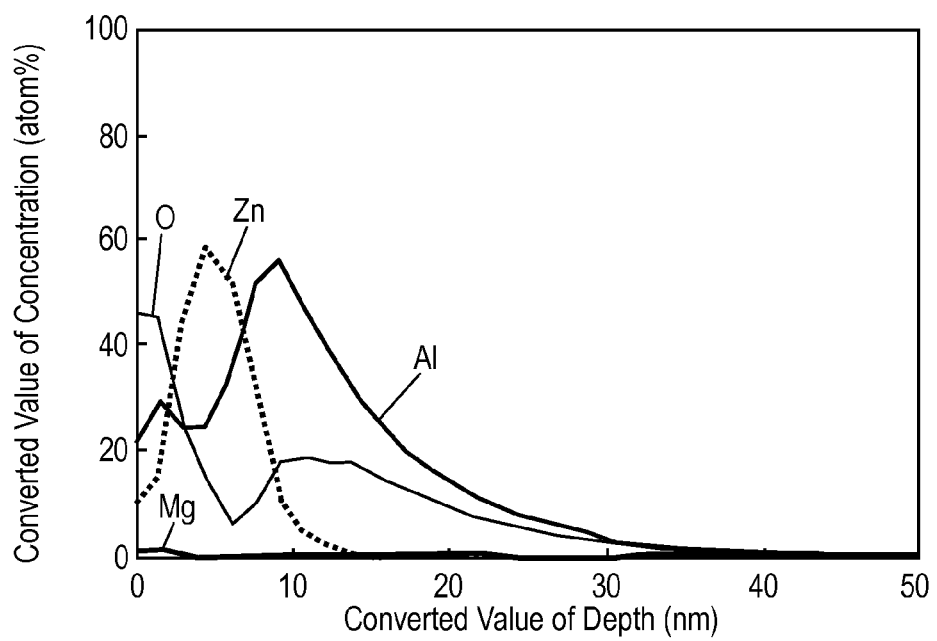
FIG. 4 shows composition of a low resistance section of a vapor deposited electrode of the metalized film capacitor in accordance with Embodiment 1.
Figure 5:
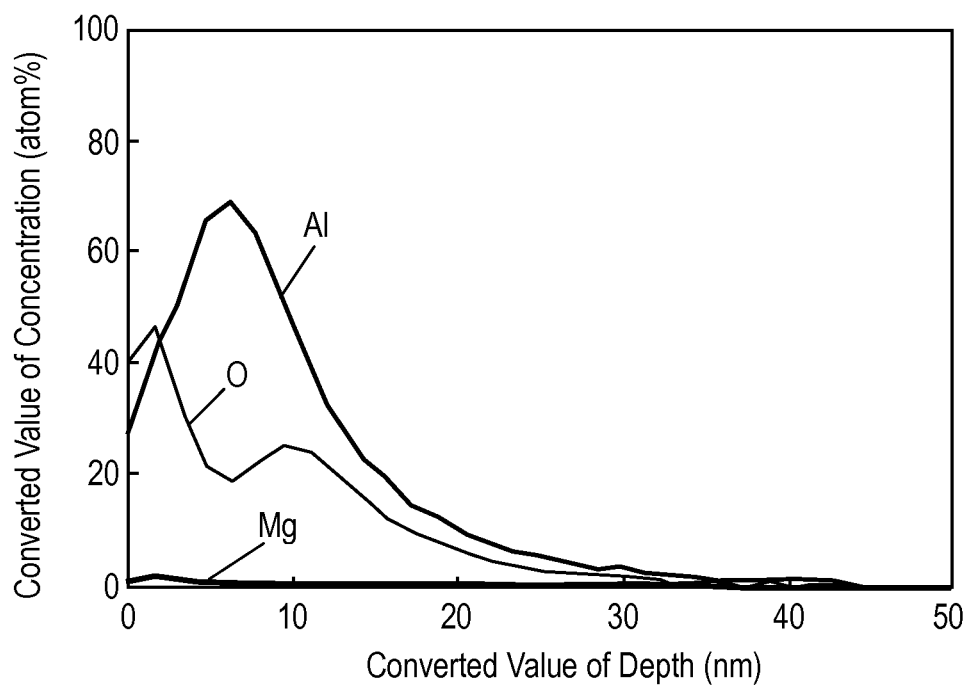
FIG. 5 shows composition of a center region of the vapor deposited metal electrode in accordance with Embodiment 1.

FIGS. 4 and 5 show the compositions of low resistance section 13a (13b) and center region 17a (17b) of vapor deposited metal electrode 4a (4b). The compositions are obtained by X-ray photoelectron spectroscopy (XPS). In FIG. 4, the horizontal axis represents converted values (nm) of a depth from upper surface 104a (104b) of low resistance section 13a (13b), and the vertical axis represents atomic percentages (atom %) of chemical elements. The depth is a distance directed from the upper surface or the lower surface of oxide film toward an inside of the oxide film in a direction perpendicularly to the surface. In FIG. 5, the horizontal axis represents a converted value of a depth from the surface (upper surface 104a, 104b) at center region 17a (17b) of vapor deposited metal electrode 4a (4b), and the vertical axis represents atomic percentages (atom %) of respective elements. The converted value of the depth may be calculated by comparing a sputtering rate of silicon dioxide film with a sputtering rate of aluminum under the same condition.

Low resistance section 13a (13b) shown in FIG. 4 has a larger concentration of Zn than center region 17a (17b) shown in FIG. 5. In Example 1, low resistance section 13a (13b) is made of the Al—Zn—Mg alloy, and center region 17a (17b) is made of Al—Mg alloy. A peak of the atomic percentage of Mg in each of low resistance section 13a (13b) and center region 17a (17b) is located at a depth having a converted value larger than 0 nm and not larger than 5 nm from upper surface 104a (104b). Oxygen atom exists on surface layers (upper surfaces 104a and 104b) of each of low resistance section 13a (13b) and center region 17a (17b), thus forming oxide films at the upper surfaces.

Figure 6A:
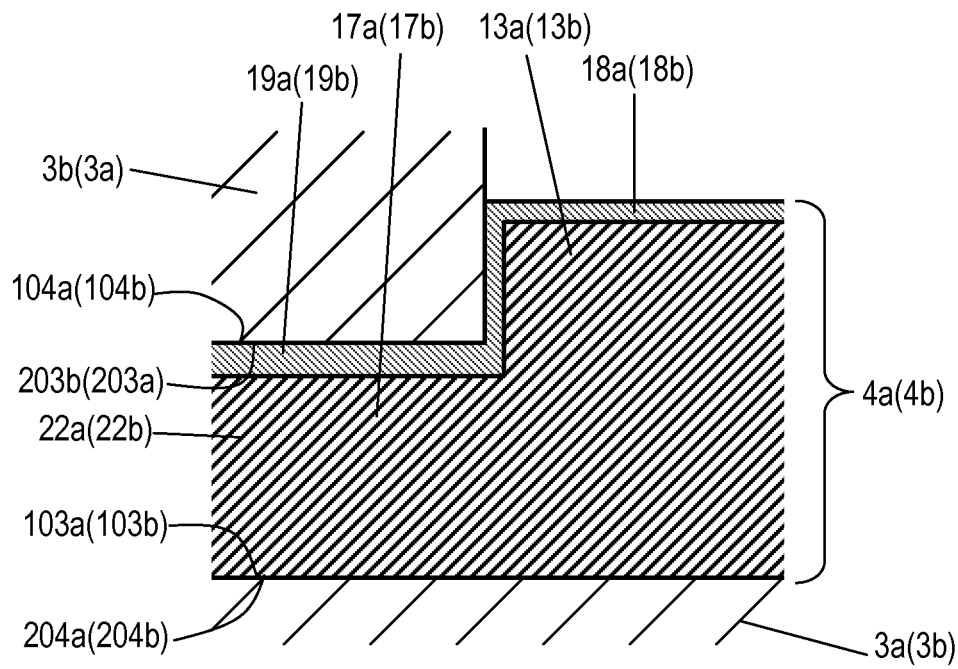
FIG. 6A is an enlarged sectional view of the vapor deposited metal electrode in accordance with Embodiment 1.

FIG. 6A is an enlarged sectional view of vapor deposited metal electrode 4a (4b) of Example 1 of metalized film capacitor 1001 in accordance with Embodiment 1. In vapor deposited metal electrode 4a (4b) of Example 1, oxide film 18a (18b) made of an oxide of the Al—Zn—Mg alloy is provided at upper surface 104a (104b) at low resistance section 13a (13b) contacting lower surface 203b (203a) of insulating film 3b (3a). Oxide film 19a (19b) made of an oxide of the Al—Mg alloy is provided on upper surface 104a (104b) at center region 17a (17b). Oxide films 18a and 19a are connected continuously with each other. As discussed above, vapor deposited metal electrode 4a (4b) includes core layer 22a (22b) provided on upper surface 103a (103b) of insulating film 3a (3b), and oxide film 18a (18b) provided on core layer 22a (22b). Core layer 22a (22b) is made of Al—Mg alloy.

Figure 6B:
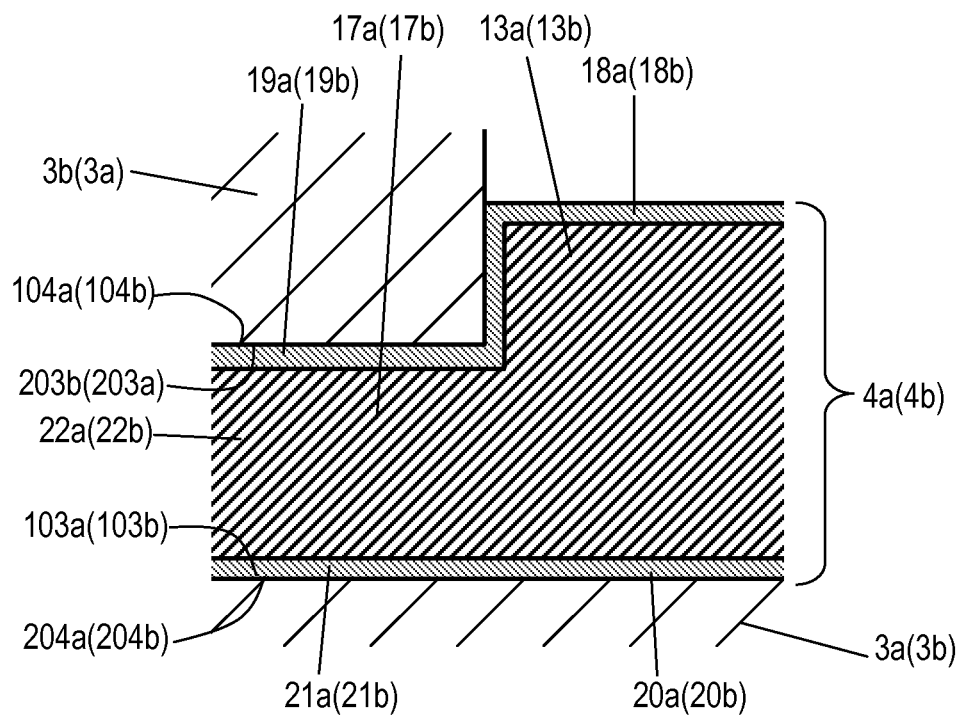
FIG. 6B is an enlarged sectional view of another vapor deposited metal electrode in accordance with Embodiment 1.

FIG. 6B is an enlarged sectional view of another vapor deposited metal electrode 4a (4b) of metalized film capacitor 1001 in accordance with Embodiment 1. In vapor deposited metal electrode 4a (4b), oxide film 18a (18b) made of an oxide of Al—Zn—Mg alloy is provided at upper surface 104a (104b) of low resistance section 13a (13b) contacting lower surface 203b (203a). Oxide film 19a (19b) made of an oxide of Al—Mg alloy is provided on upper surface 104a (104b) at center region 17a (17b). Oxide film 20a (20b) made of an oxide of Al—Zn—Mg alloy is provided at lower surface 204a (204b) at low resistance section 13a (13b) contacting upper surface 103a (103b) of insulating film 3a (3b). Oxide film 21a (21b) made of an oxide of Al—Mg alloy at lower surface 204a (204b) at center region 17a (17b). Oxide films 18a and 19a are connected continuously with each other, and oxide films 18b and 19b are connected continuously with each other. Oxide films 20a and 21a are connected continuously with each other. Oxide films 20b and 231b are connected continuously with each other. As discussed above, vapor deposited metal electrode 4a (4b) includes oxide films 20a and 21a (20b and 21b) provided on upper surface 103a (103b) of insulating film 3a (3b), core layer 22a (22b) provided on the upper surfaces of oxide films 20a and 21a (20b and 21b), and oxide films 18a and 19a (18b and 19b) provided on the upper surface of core layer 22a (22b).

In vapor deposited metal electrodes 4a and 4b shown in FIG. 6A of Example 1, low resistance section 13a (13b) has a smaller average atomic percentage of Mg than center region 17a (17b).

A vapor deposited metal electrode of a metalized film capacitor of Comparative Example 1 includes a low resistance section having the same structure as low resistance section 13a (13b) and made of Al and Zn, and a center region made of Al. A lower layer of the low resistance section is made of an Al layer that is formed unitarily with the center region. The low resistance section is formed by depositing Zn on this Al layer.

Example 1 and Comparative Example 1 are inspected in a humidity resistance test and a short-time withstanding voltage test.

In the humidity resistance test, a changing rate (%) of a capacitance of sample capacitors having a voltage of 500 F for 900 hours under a high temperature of 85° C. and a high humidity condition of 85% r.h. The changing rate is provided by the procedure that a difference provided by subtracting capacitance C0 before applying the voltage from capacitance Ct after applying the voltage is divided by capacitance C0.

The short-time withstanding voltage test employs a metalized film of a sample and another metalized film as a reference. The voltage applied to the capacitor is increased by a given amount at predetermined intervals in the atmosphere at a temperature of 100° C. Then, the voltage at which the changing rate of the capacitance becomes −5% is measured as a withstanding voltage. This changing rate is calculated by the procedure that a difference provided by subtracting withstanding voltage V0 of the reference from withstanding voltage Vt of the sample is divided by withstanding voltage V0. The metalized film used as the reference is formed by vapor-depositing aluminum on a surface of a film. This surface is not oxidized.

Figures 7, 8:
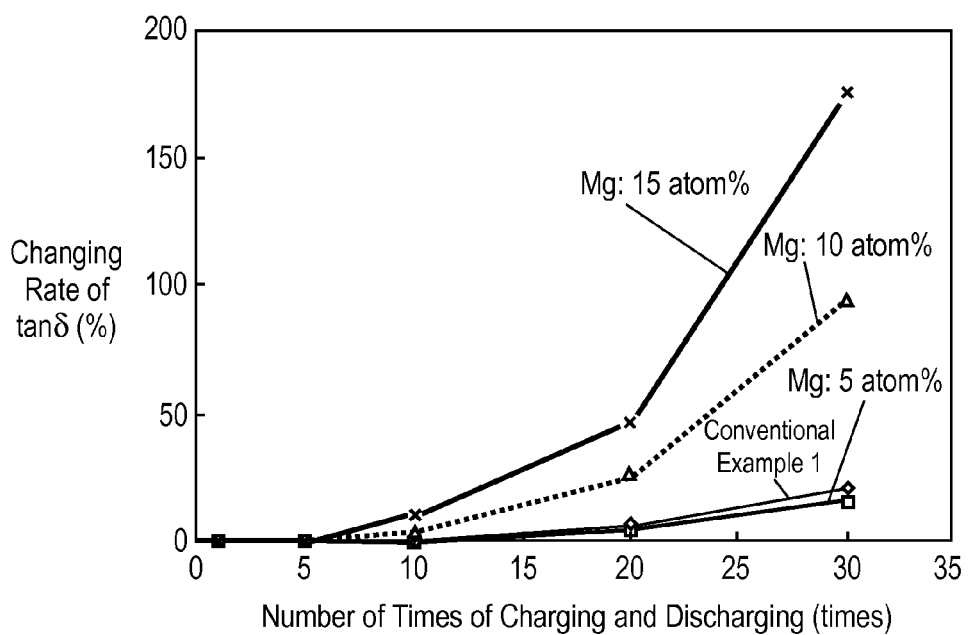
FIG. 7 shows results of a humidity resistance test and a short-time withstanding voltage test for the metalized film capacitor in accordance with Embodiment 1.
FIG. 8 shows relations between the number of charge/discharge and the rate of change of tan δ of the metalized film capacitor in accordance with Embodiment 1.

FIG. 7 shows relations of the thicknesses (nm) of oxide film 19a (19b) of the vapor deposited metal electrode of the metalized film capacitor of Example 1 and the thickness of Comparative Example 1, the changing rate (%) of the capacitance obtained in the humidity resistance test, and the changing ratio (%) of the withstanding voltage obtained in the short-time withstanding voltage test. The thickness of oxide film 19a (19b) is measured on a photograph of a cross section of center region 17a (17b) of electrode 4a (4b) captured with a scanning electron microscope.

As shown in FIG. 7, Example 1 has a smaller change of the capacitance than Comparative Example 1 although the thickness of oxide films 18a to 21a (18b to 21b) is smaller, and thus, Example 1 is excellent in humidity resistance. Example 1 upon having the thickness of the oxide film not smaller than 0.4 nm exhibits a small changing rate of the capacitance not less than −10%, thus having a high humidity resistance. If Comparative Example 1 has such small changing rate not less than −10%, the oxide film is required to have a thickness not smaller than 20 nm. Example 1 with oxide films 18a to 21a (18b to 21b) having the thickness smaller than 20 nm has a small change of the capacitance, thus increasing the humidity resistance.

Oxide films 18a to 21a (18b to 21b) of Example 1 having thickness not larger than 5 nm reduce the changing rate of the withstanding voltage not smaller than −4%, thus reducing an amount of the change, and thus, Example 1 has high withstanding voltage properties. Even if the thickness of oxide films 18a to 21a (18b to 21b) exceeds 5 nm, Example 1 has a higher withstanding voltage than Comparison Example 1.

As described above, Example 1 has better humidity resistance and better withstanding voltage properties than Comparative Example 1 if the thickness of oxide films 18a to 21a (18b to 21b) is smaller than 20 nm. If the thickness of the film ranges from 0.4 nm to 5 nm, Example 1 has a small changing rate of the capacitance not smaller than −10%. Example 1 has a small changing rata of the withstanding voltage not smaller than −4%. Example 1 thus obtains a high humidity resistance as well as high withstanding voltage properties.

A reason of this high humidity resistance and the high withstanding voltage properties is that vapor deposited electrode 4a (4b) of Example 1 has center region 17a (17b) made of Al—Mg alloy. Since magnesium reacts with water faster than aluminum, so that the magnesium reacts the water contained in insulating films 3a and 3b, and then forms oxide films 19a, 19b, 21a, and 21b. This reaction thus reduces the water contained in insulating films 3a and 3b, and prevents electrodes 4a and 4b from being oxidized and deteriorated. Once being formed, oxide films 19a, 19b, 21a, and 21b prevents more oxidization, and prevents electrodes 4a and 4b from having an insulating property, hence reducing the change of the capacitance.

The Al—Mg alloy in vapor deposited metal electrodes 4a and 4b facilitates the forming of oxide films 19a, 19b, 21a, and 21b while absorbing moisture, and reduce a change in the capacitance as well as increase the humidity resistance.

The oxide film made of Al—Mg alloy has a high humidity resistance even if the film has a small thickness, so that the thickness of electrodes 4a and 4b can be reduced while maintaining the self-healing function.

As described above, Example 1 of metalized film capacitance 1001 increases the humidity resistance while maintaining the withstanding voltage.

Since magnesium reacts with water faster than aluminum, oxide film 19a (19b) made of Al—Mg alloy can be formed, thereby providing higher humidity resistance.

Another reason for obtaining higher humidity resistance and higher withstanding voltage properties is that low resistance section 13a (13b) is made of Al—Zn—Mg alloy. This structure prevents the entire of low resistance section 13a (13b) from being oxidized and deteriorated. As a result, the humidity resistance can be increased without losing the adhesion between electrodes 4a and 4b and electrode terminals 6a, 6b that are the sprayed-metal electrodes.

According to a reference document, "Surface Technology Vol. 57, No. 1 pages 84-89 (2006)", in the case that a plating film made of Zn—Mg alloy is formed on a copper plate in a plating bath filled with ionic liquid, the plating film having better corrosion resistance than a film made of only Zn plating is obtained. When the amount of Mg is larger than a predetermined amount (the reference document shows that the predetermined amount is larger than 2.5 mol %), the corrosion resistance increases about. 20 times than the film by only Zn plating.

As discussed above, the Al—Zn—Mg alloy in low resistance sections 13a and 13b allows Example 1 to have higher corrosion resistance, i.e. higher humidity resistance, than low resistance sections made of Al—Zn alloy or only Zn.

When water enters the capacitor through electrode terminals 6a and 6b or via a gap of a package thereof, low resistance sections 13a and 13b can more easily contact the water than any other section since electrode terminals 6a and 6b and the package are located close to outer environment. Therefore, as discussed in Example 1, the increasing of the humidity resistance of low resistance sections 13a and 13b is useful to increase the humidity resistance of the entire of the metalized film capacitor. In Example 1, Mg is deposited at a larger amount locally bear the surface (upper surface 103a and 103b and lower surface 203a and 203b), hence preventing the oxidization and deterioration more efficiently.

The atomic percentage of Mg in low resistance sections 13a and 13b is preferably lower than that at center regions 17a and 17b. An excessively higher atomic percentage of Mg in low resistance sections 13a and 13b may reduce a withstanding current of electrode terminals 6a and 6b.

The atomic percentage of Mg in low resistance sections 13a and 13b and in vapor deposited metal electrodes 4a and 4b is preferably not larger than 5 atom %. FIG. 8 shows the relation between the number of times of charging and discharging of the metalized film capacitor in accordance with Embodiment 1 and a change ratio of tan δ. To be more specific, the atomic percentage of Mg in Al—Zn—Mg alloy is determined to be 5 atom %, 10 atom %, and 15 atom %. The number of times of charging and discharging the capacitor at a voltage of 650 V and the change rate of tan δ in these three cases are measured, and the change rate of tan δ of a vapor deposited metal electrode made of Al only is measured. As shown in FIG. 8, if atomic percentage is 5 atom %, the change rate of tan δ is smaller than that of the electrode made of Al only; however, if atomic percentage is 10 atom % and 15 atom %, the change rate of tan δ drastically increases.

If the width of low resistance sections 13a and 13b, distance d, in direction 1001a from ends 304a and 304b which joined to electrode terminals 6a and 6b is excessively large, the reliability decreases. This width is adjusted appropriately.

Figure 9:
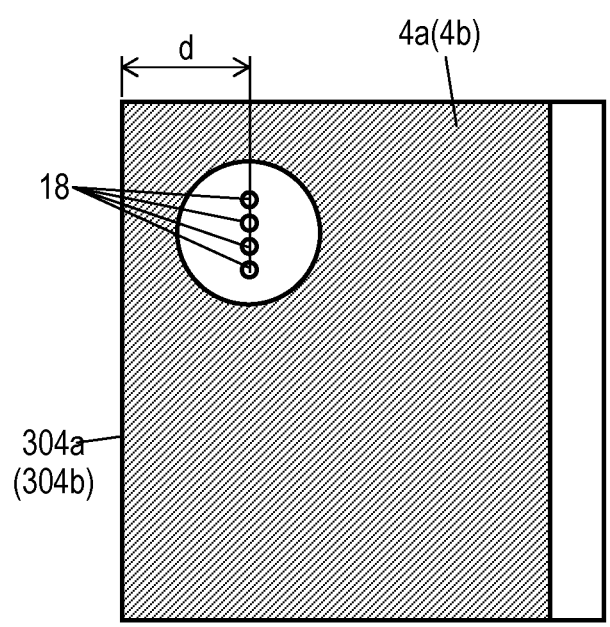
FIG. 9 illustrates a method for measuring a resistance of the vapor deposited metal electrode in accordance with Embodiment 1.

A reliability test is performed on distance d in direction 1001a from ends 304a and 304b of vapor deposited metal electrodes 4a and 4b. FIG. 9 is a schematic view of vapor 9 deposited metal electrode 4a in accordance with Embodiment 1 for illustrating a method of measuring the resistance of electrode 4a. To be more specific, the reliability test is performed on distance d providing electrodes 4a and 4b with the resistance not smaller than 5Ω/□. The resistance is measured with resister meter Lorester GP model MCP-T610 made by Mitsubishi Chemical Analytech Co., Ltd. Constant current application method with 4-terminals and 4-probes is used, where 4-terminals probe 118 is employed for measurement. In the reliability test, 750 V is applied for 2000 hours at 100° C. After applying the voltage, the changing rate of the capacitance is measured. When this rate is small, not less than −5%, the reliability is determined to be high. When this rate is less than −5%, the reliability is determined to be low. When distance d providing the resistance not smaller than 5Ω/□ is 2.0 mm or 2.5 mm, the changing rate of the capacitance is small, i.e., larger than −5%, so that high reliability is obtainable. When distance d is 3.5 mm, the changing rate is large, i.e., smaller than −5%, so that the high reliability cannot be expected. When distance d providing the resistance not smaller than 5Ω/□ is smaller than 2.5 mm, the changing rate of the capacitance is small, i.e., larger than −5%, so that the reliability can be maintained.

In Example 1, center regions 17a and 17b of electrodes 4a and 4b are made of Al—Mg alloy; however, center regions 17a and 17b can be made of materials other than Al—Mg alloy. For instance, center regions 17a and 17b can be made of Al only, and low resistance sections 13a and 13b can be made of Al—Zn—Mg alloy. This structure also advantageously increases the humidity resistance of low resistance sections 13a and 13b.

Exemplary Embodiment 2

Figure 10:
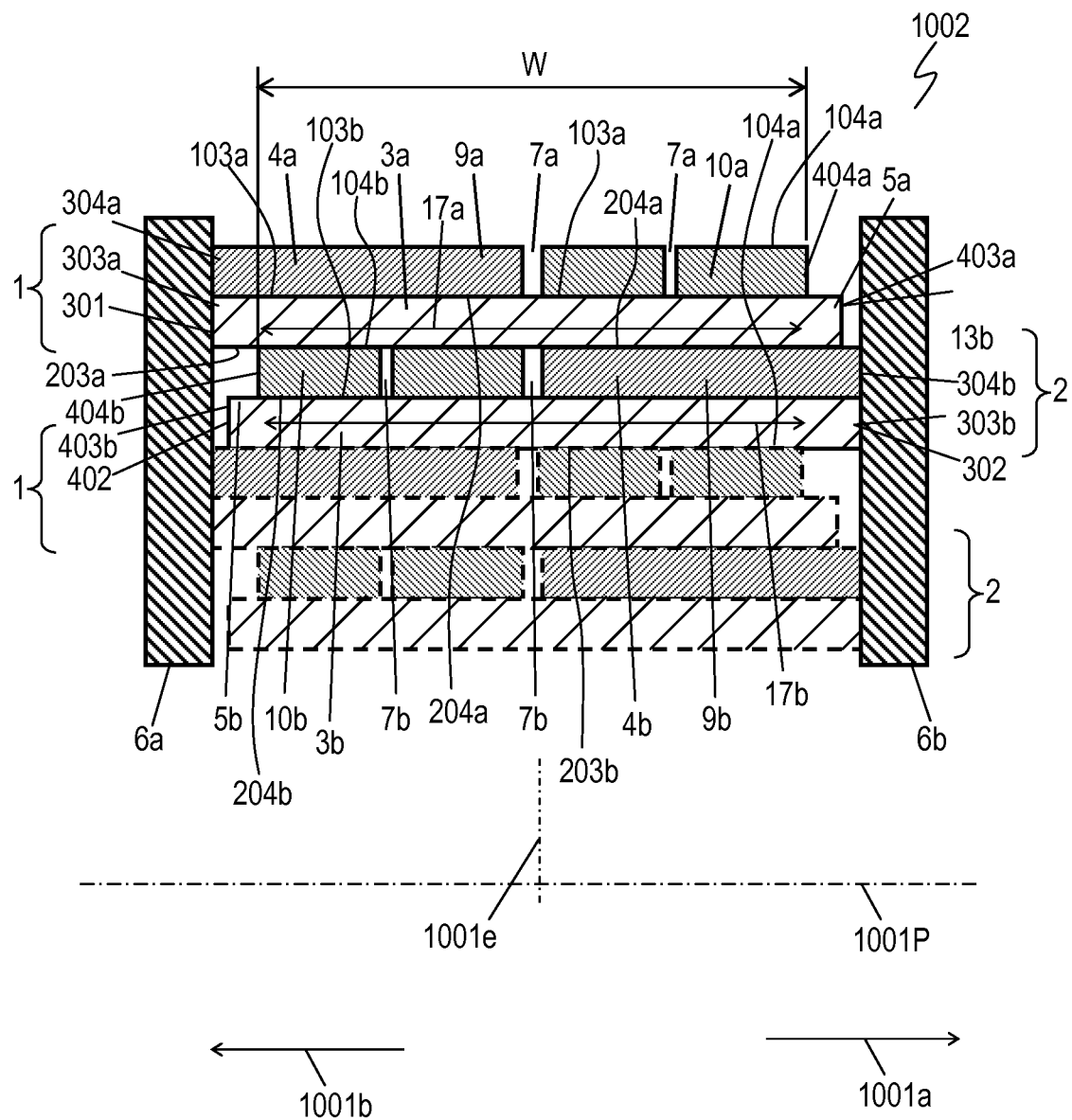
FIG. 10 is a sectional view of a metalized film capacitor in accordance with Exemplary Embodiment 2 of the invention.
Figure 11:
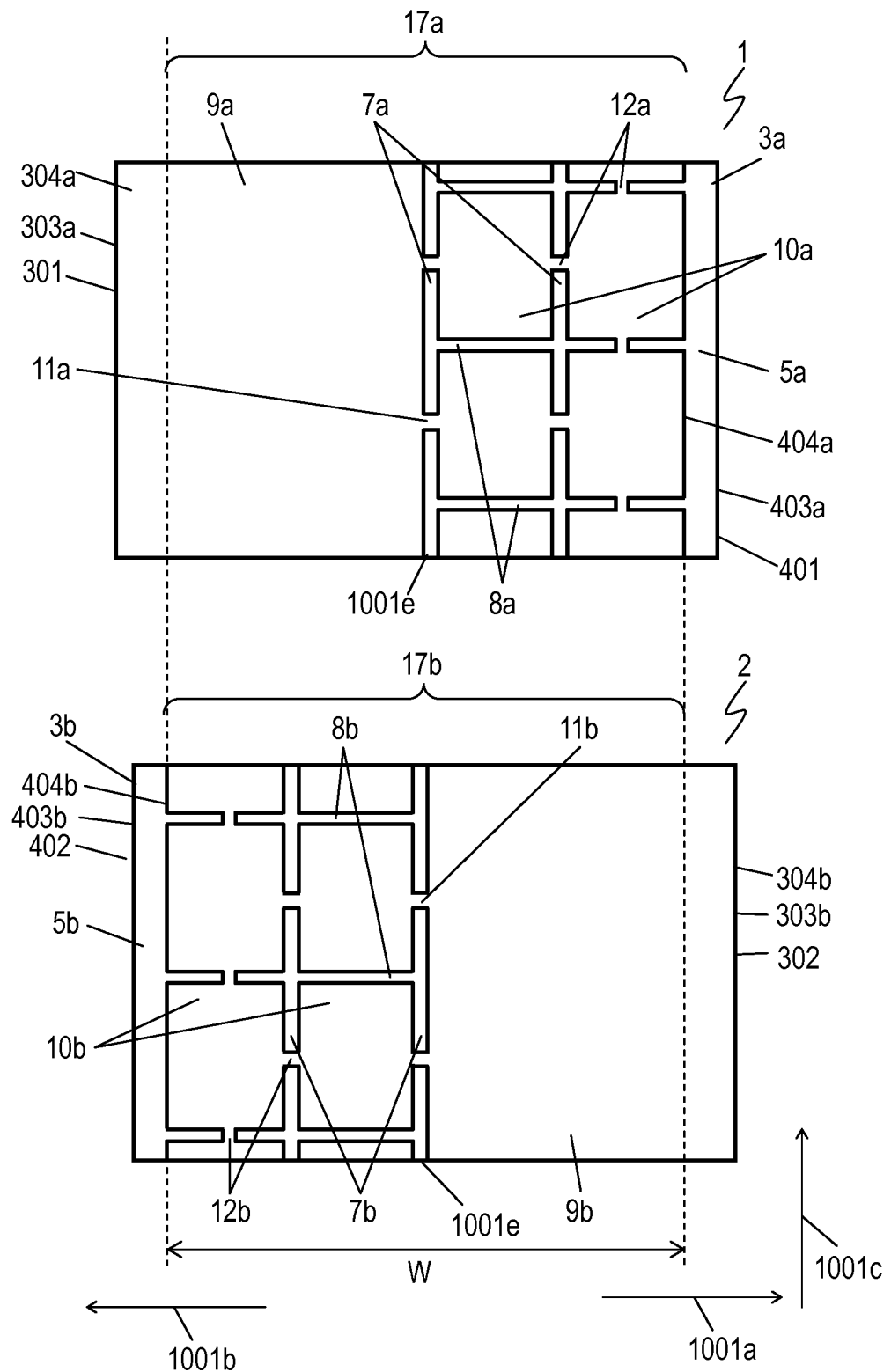
FIG. 11 is a plan view of a metalized film used in the metalized film capacitor in accordance with Embodiment 2.

FIG. 10 is a sectional view of metalized film capacitor 1002 in accordance with Exemplary Embodiment 2. FIG. 11 is a plan view of metalized films 1 and 2 of metalized film capacitor 1002. In FIGS. 10 and 11, components identical to those of metalized film capacitor 1001 shown in FIGS. 1 and 2 in accordance with Embodiment 1 are denoted by the same reference numerals. In metalized film capacitor 1002 shown in FIGS. 10 and 11, vapor deposited metal electrodes 4a and 4b do not include low resistance sections 13a and 13b.

Figure 12A:
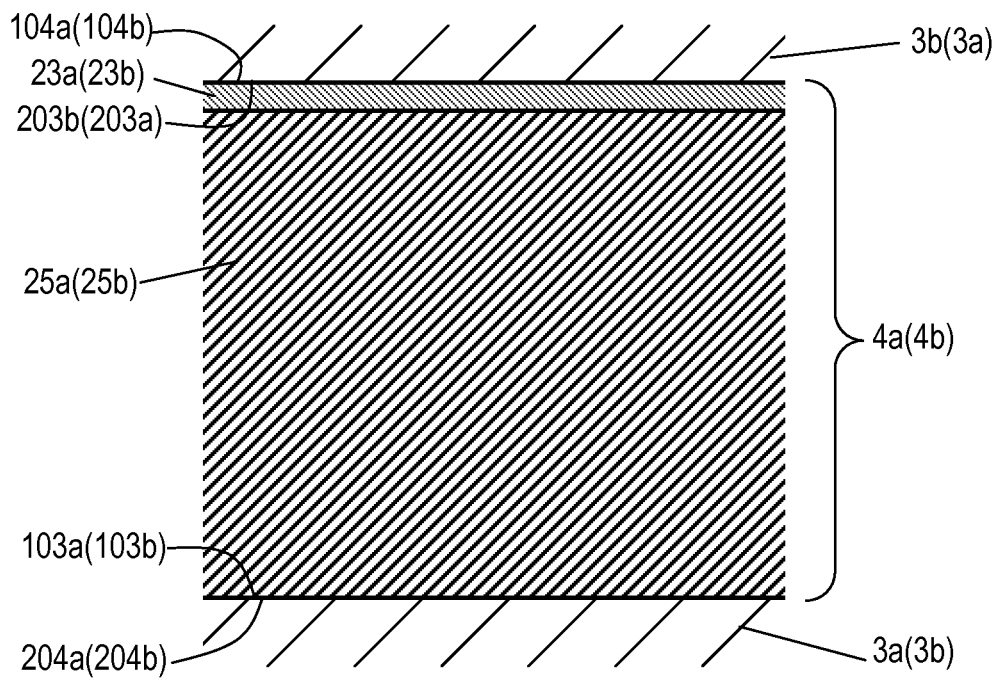
FIG. 12A is an enlarged sectional view of a vapor deposited metal electrode of the metalized film capacitor in accordance with Embodiment 2.

FIG. 12A is an enlarged sectional view of vapor deposited metal electrode 4a (4b) of capacitor 1002 in accordance with Embodiment 2. Electrode 4a shown in FIG. 12A is mainly made of aluminum, and includes oxide film 23a made of $MgAl_2O_4$ provided on upper surface 104a. Electrode 4a thus includes core layer 25a (25b) provided on upper surface 103a (103b) of insulating film 3a (3b) and oxide film 23a (23b) provided on an upper surface of core layer 25a (25b). Vapor deposited metal electrode 4b is mainly made of aluminum, and includes oxide film 23b made of $MgAl_2O_4$ and provided on upper surface 104b. One of electrodes 4a and 4b may not have oxide film 23a or 23b.

Figure 12B:
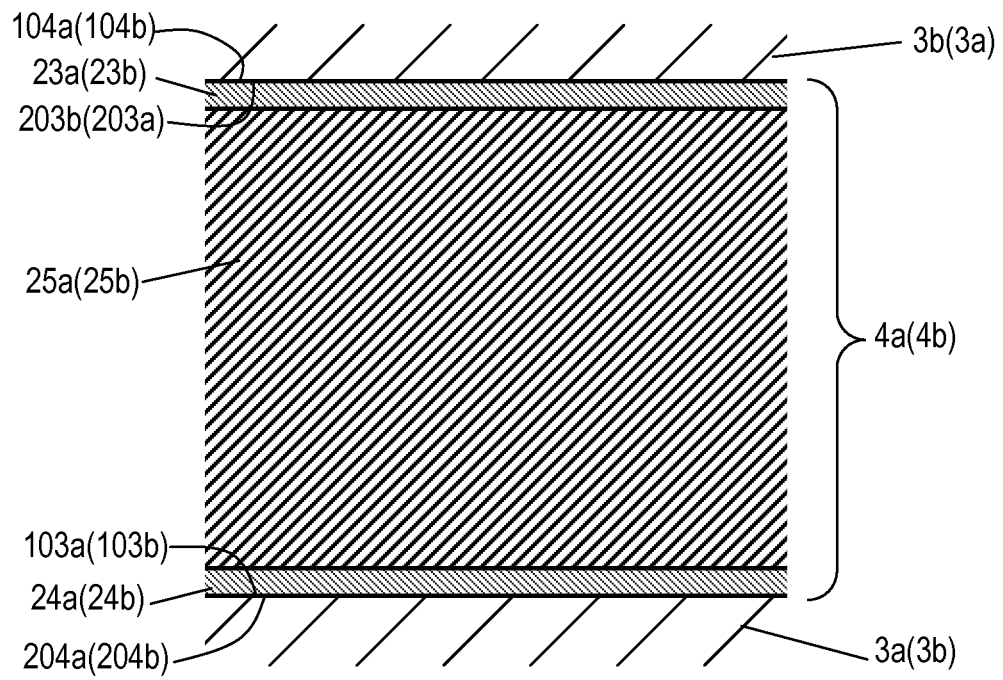
FIG. 12B is an enlarged sectional view of another vapor deposited metal electrode of the metalized film capacitor in accordance with Embodiment 2.

FIG. 12B is an enlarged sectional view of another vapor deposited metal electrode 4a (4b) of metalized film capacitor 1002 in accordance with Embodiment 2. Electrode 4a shown in FIG. 12B is mainly made of aluminum, and includes oxide film 23a made of $MgAl_2O_4$ provided on upper surface 104a as well as oxide film 24a made of $MgAl_2O_4$ provided on lower surface 204a. Vapor deposited metal electrode 4a thus includes core layer 25a (25b) provided on oxide film 24a (24b) and oxide film 23a (23b) provided on an upper surface of core layer 25a (25b). Vapor deposited metal electrode 4b is mainly made of aluminum, and includes oxide film 23b made of $MgAl_2O_4$ provided at upper surface 104b and oxide film 24b made of $MgAl_2O_4$ provided at lower surface 204b. One of electrodes 4a and 4b may not include oxide film 23a, 23b, 24a, or 24b.

Example 2

Vapor deposited metal electrodes 4a and 4b of Example 2 of metalized film capacitor 1002 have a structure shown in FIG. 12A, and are made of Al—Mg alloy. Insulating film 3a and vapor deposited metal electrode 4a of metalized film 1 of Example 2 are made of the same materials and formed by the same method as insulating film 3b and vapor deposited metal electrode 4b of metalized film 2, respectively. Metalized films 1 and 2 commonly have the following characteristics of the metalized film of Example 2 discussed below.

Vapor deposited metal electrodes 4a and 4b made of Al—Mg alloy are formed by, e.g. depositing aluminum and magnesium alternately or depositing aluminum and magnesium simultaneously.

Magnesium has smaller standard Gibbs energy of formation per 1 mol of metal-oxygen linkage than aluminum. Magnesium can be thus diffused on a surface of deposited film depending on a degree of vacuum or by oxygen introduction. Electrodes 4a and 4b of Example 2 are made of aluminum, and oxide films 23a and 23b made of $MgAl_2O_4$ at upper surfaces 104 and 104b, respectively.

Figures 13, 14:
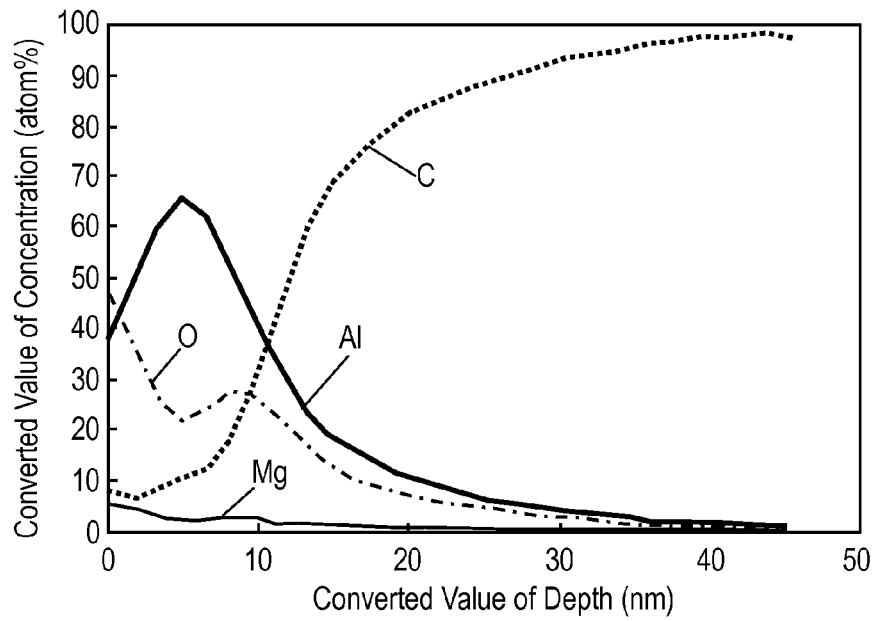
FIG. 13 shows composition of the vapor deposited metal electrode of the metalized film capacitor in accordance with Embodiment 2.
FIG. 14 shows results of tests to determine a humidity resistance and a short-time withstanding voltage of the metalized film capacitor in accordance with Embodiment 2.

FIG. 13 shows relations of a converted value of a depth (distance) (nm) from upper surfaces 104a and 104b of electrodes 4a and 4b and atomic percentage (atom %) of respective elements. The relations are obtained by an X-ray photoelectron spectroscopy (XPS). The converted value of the depth from the surface (upper surfaces 104a and 104b and lower surfaces 204a and 204b) of electrodes 4a and 4b can be calculated by comparing a sputtering rate of silicon dioxide film with a sputtering rate of aluminum under the same condition. As shown in FIG. 13, vapor deposited metal electrodes 4a and 4b of Example 2 contain Mg at surface layers including the surfaces (upper surfaces 104a and 104b and lower surfaces 204a and 204b) and the vicinity of the surfaces.

An X-ray diffraction (XRD) results in that oxide films 23a and 23b made of $MgAl_2O_4$ is confirmed. In other words, oxide films 23a and 23b made of $MgAl_2O_4$ exist on upper surfaces 104a and 104b of electrodes 4a and 4b, respectively.

A vapor deposited metal electrode of Comparative Example 2 of a metalized film capacitor is made of only aluminum. An $Al_2O_3$ film is formed as an oxide film on a surface of the vapor deposited metal electrode of Comparative Example 2. This $Al_2O_3$ film can be formed by depositing aluminum while oxygen gas is introduced into a depositing machine, or by depositing aluminum before oxidization.

The humidity resistance test and the short-time withstanding voltage test are performed to Example 2 and Comparative Example 2.

In the humidity resistance test, a voltage of 500 V is applied to the capacitor for 900 hours at a high temperature of 85° C. in a high humidity of 85% r.h. Then, a changing rate (%) of a capacitance of the capacitor is calculated. The changing rate is calculated by the procedure that a difference provided by subtracting capacitor C0 before the applying of the voltage from capacitance Ct after the applying of the voltage is divided by capacitance C0.

The short-time withstanding voltage test employs a metalized film of sample and another metalized film as a reference. The voltage applied to the capacitor is increased by a predetermined amount at predetermined intervals in the atmosphere at a temperature of 100° C. Then, a voltage at which the changing rate of the capacitance becomes −5% is measured as a withstanding voltage. The changing rate of the withstanding voltage is calculated by the procedure that a difference provided by subtracting withstanding voltage V0 of the reference from withstanding voltage Vt of the sample is divided by withstanding voltage V0.

The metalized film used as the reference is formed by depositing aluminum on a surface of a film. This surface is not oxidized.

FIG. 14 shows results of the humidity resistance test and the short-time withstanding voltage test on metalized film capacitance 1002. FIG. 14 shows the thickness (nm) of the oxide film 23a (23b) made of $MgAl_2O_4$ film of Example 2, the changing rate (%) of the capacitance obtained in the humidity resistance test, and the changing rate (%) of the withstanding voltage obtained in the short-time withstanding voltage test. FIG. 14 also shows the thickness (nm) of the oxide film made of $Al_2O_3$ film and the changing rate (%) of the capacitance during the humidity resistance test and the changing rate (%) of the withstanding voltage during the short-time withstanding voltage test. The thickness of each oxide film is measured on a photograph of a cross section of each oxide film captured with a scanning electron microscope.

As shown in FIG. 14, Example 2 including oxide film 23a (23b) made of $MgAl_2O_4$ exhibits a smaller changing rate of the capacitance than Comparative Example 2 including the oxide film made of $Al_2O_3$ although the thickness of oxide film 23a (23b) of Example 2 is smaller than the oxide film of Comparative Example 2. Thus, example 2 is excellent in humidity resistance. Upon having a thickness not smaller than 0.4 nm, Example 2 exhibits a small changing rate of the capacitance not less than −10%, thus having a high humidity resistance. If Comparative Example 2 needs to reduce the changing rate of the capacitance not less than −10%, the oxide film made of $Al_2O_3$ is required to have a thickness larger than 20 nm. In Example 2, oxide film 23a (23b) having the thickness smaller than 20 nm provide a small changing rate of the capacitance, thus providing Example 2 with high humidity resistance Upon having a thickness not larger than 5 nm, oxide film 23a (23b) of Example 2 exhibits a small changing rate of the withstanding voltage not smaller than −4%. Even if the thickness of the oxide films exceeds 5 nm, Example 2 has a higher withstanding voltage than Comparative Example 2 including the $Al_2O_3$ film.

As described above, oxide film 23a (23b) of Example 2 having a thickness smaller than 20 nm provides Example 2 with better humidity resistance and higher withstanding voltage than Comparative Example 2. Oxide film 23a (23b) of Example 2 having a thickness ranging from 0.4 nm to 5 nm provides a small changing rate of the capacitance not smaller than −10% and a small changing rate of the withstanding voltage not smaller than −4%, thus providing Example 2 with high humidity resistance and high withstanding voltage.

A reason why Example 2 of metalized film capacitor 1002 has high humidity resistance and high withstanding voltage will be described below. Since magnesium reacts with water faster than aluminum, magnesium reacts with the water contained in insulating films 3a and 3b, and then, forms oxide films 23a and 23b. This reaction thus reduces the water contained in insulating films 3a and 3b, and prevents vapor deposited metal electrodes 4a and 4b from being oxidized and deteriorated. Once being formed, oxide films 23a and 23b provide no more oxidization, and prevents vapor deposited metal electrodes 4a and 4b from having an insulating property, thereby reducing the change of the capacitance.

The Al—Mg alloy in vapor deposited metal electrodes 4a and 4b of Example 2 facilitates the forming of oxide films 23a and 23b while absorbing moisture, accordingly reducing the change of the capacitance and increasing the humidity resistance.

The oxide film made of Al—Mg alloy has a high humidity resistance even if having a small thickness, accordingly allowing vapor deposited metal electrodes 4a and 4b to have a small thickness while maintaining the self-healing function.

Example 2 thus can increase the humidity resistance while maintaining the withstanding voltage properties.

Since magnesium reacts with water faster than aluminum, an oxide film made of only magnesium (MgO film) has higher humidity resistance than an oxide film made of aluminum only ($Al_2O_3$ film). However, an oxide film made of Al—Mg alloy ($MgAl_2O_4$ film) does not have a deliquescent property that an MgO film has, hence reducing the humidity resistance of $MgAl_2O_4$ film a little when it absorbs moisture. The $MgAl_2O_4$ film provided on the surface increases the humidity resistance of vapor deposited metal electrodes 4a and 4b.

The oxide film made of $MgAl_2O_4$ film can be formed on either one of vapor deposited metal electrodes 4a and 4b, or on both the electrodes. This oxide film may be preferably provided on electrode 4a functioning as a positive electrode. Since $MgAl_2O_4$ has an insulation property, vapor deposited metal electrode 4a, i.e. the positive electrode made of $MgAl_2O_4$ is prevented from being oxidized while a voltage is applied. In other words, the oxide film prevents aluminum contained in vapor deposited metal electrode 4a from being oxidized and from changing into $Al_2O_3$ that has an insulation property, accordingly preventing the capacitance from decreasing. Oxide film 24a shown in FIG. 12B is made of the same material as oxide film 23a and has the same effects.

Exemplary Embodiment 3

A metalized film capacitor in accordance with exemplary Embodiment 3 has the same structure as metalized film capacitor 1002 in accordance with Embodiment 2 shown in FIGS. 10 and 11.

In vapor deposited metal electrodes 4a and 4b of the metalized film capacitor in accordance with Embodiment 3, the concentration by weight of magnesium along a direction parallel to upper surfaces 104a and 104b and lower surfaces 204a and 204b has a relative standard deviation not larger than 0.2. This means that the concentration by weight of magnesium disperses within a small range. Examples will be detailed below.

Example 3

Vapor deposited metal electrodes 4a and 4b of Example 3 of the metalized film capacitor are formed by depositing the metal materials of Al and Mg onto upper surfaces 103a and 103b of insulating films 3a and 3b. The aluminum metal material contains Al at high purity not less than 99.9 wt % of Al. The magnesium metal material contains Mg at high purity not less than 99.9 wt % of Mg. Such high purity materials provide the vapor deposited metal electrodes that contain a small amount of impurities and have excellent properties. When the quantities and distributions of Al and Mg are adjusted in a depositing process, such high purity materials can control the quantities and distributions of Al and Mg in the electrodes easily.

Insulating film 3a and vapor deposited metal electrode 4a of metalized film 1 of Example 3 are made of the same materials by the same method as insulating film 3b and electrode 4b of metalized film 2. Metalized films 1 and 2 thus commonly have the characteristics of the metalized film of Example 3 discussed below.

The concentration of Mg contained in electrode 4a (4b) of metalized film 1 (2) used in Example 3 of the metalized film capacitor is measured. A circular sheet of the metalized film having a diameter of 30 mm is cut out at every 10 meters from the metalized film, and the concentrations of the magnesium contained in these sheets are measured by a fluorescent X-ray analysis (XRF). Ten sheets are cut from the metalized film, and are subjected to the Mg concentration measurement. The average of the concentrations of Mg of these ten sheets is 1.7%. A standard deviation of the concentrations of Mg is 0.34%, and a relative standard deviation thereof is 0.2. The relative standard deviation is obtained by dividing the standard deviation by the average.

Example 4

Vapor deposited metal electrode 4a functioning as a positive electrode is made of the same metal materials of Al and Mg as electrode 4a of Example 3. Vapor deposited metal electrode 4b functioning as a negative electrode is made of the same metal materials of Al and Mg as electrode 4b of Example 3. Insulating film 3a and vapor deposited metal electrode 4a of metalized film 1 of Example 4 are made of the same materials by the same method as insulating film 3b and electrode 4b of metalized film 2. Metalized films 1 and 2 thus commonly have the characteristics of the metalized film of Example 4 discussed below.

Ten sheets cut from the metalized film to be used for Example 4 of the metalized film capacitor are measured in the concentrations of Mg. The average of the concentrations of Mg is 4.0%. The standard deviation of the concentrations of Mg is 0.1%. The relative standard deviation is 0.025.

Example 5

Vapor deposited metal electrode 4a functioning as a positive electrode is made of the same metal materials of Al and Mg as electrode 4a of Example 3. Vapor deposited metal electrode 4b functioning as a negative electrode is made of the same metal materials of Al and Mg as electrode 4b of Example 3. Insulating film 3a and vapor deposited metal electrode 4a of metalized film 1 of Example 5 are made of the same materials by the same method as insulating film 3b and electrode 4b of metalized film 2. Metalized films 1 and 2 thus commonly have the characteristics of the metalized film of Example 5 discussed below.

Ten sheets cut from the metalized film to be used for Example 5 of the metalized film capacitor are measured in the concentrations of Mg. The average of the concentrations of Mg is 5.6%. The standard deviation of the concentrations of Mg is 0.29%. The relative standard deviation of the concentrations is 0.051.

Comparative Examples 3 to 5 are prepared for comparison with examples 3 to 5. Comparative Examples 3 to 5 have rather greater unevenness in the distribution of Mg in the vapor deposited metal electrodes.

Comparative Example 3

Vapor deposited metal electrode 4a functioning as a positive electrode is made of the same metal materials of Al and Mg as electrode 4a used in Example 3. Vapor deposited metal electrode 4b functioning as a negative electrode is made of the same metal materials. Insulating film 3a and vapor deposited metal electrode 4a of metalized film 1 of Comparative Example 3 are made of the same materials by the same method as insulating film 3b and electrode 4b of metalized film 2. Metalized films 1 and 2 thus commonly have the characteristics of the metalized film of Comparative Example 3 discussed below.

Ten sheets cut from the metalized film to be used for Comparative Example 3 of the metalized film capacitor are measured in the concentrations of Mg. The average of the concentrations of Mg is 1.0%. The standard deviation of the concentrations of Mg is 0.8%. The relative standard deviation of the concentrations is 0.8.

Comparative Example 4

Vapor deposited metal electrode 4a functioning as a positive electrode is made of the same metal materials of Al and Mg as electrode 4a used in Example 3. Vapor deposited metal electrode 4b functioning as a negative electrode is made of the same metal materials. Insulating film 3a and vapor deposited metal electrode 4a of metalized film 1 of Comparative Example 4 are made of the same materials by the same method as insulating film 3b and electrode 4b of metalized film 2. Metalized films 1 and 2 thus commonly have the characteristics of the metalized film of Comparative Example 4 discussed below.

Ten sheets cut from the metalized film to be used for Comparative Example 4 of the metalized film capacitor are measured in the concentrations of Mg. The average of the concentrations of Mg is 2.5%. The standard deviation of the concentrations of Mg is 6.93%. The relative standard deviation of the concentrations is 2.77.

Comparative Example 5

Vapor deposited metal electrode 4a functioning as a positive electrode is made of the same metal materials of Al and Mg as electrode 4a used in Example 3. Vapor deposited metal electrode 4b working as a negative electrode is made of the same metal materials. Insulating film 3a and vapor deposited metal electrode 4a of metalized film 1 of Comparative Example 5 are made of the same materials by the same method as insulating film 3b and electrode 4b of metalized film 2. Metalized films 1 and 2 thus commonly have the characteristics of the metalized film of Comparative Example 5 discussed below.

Ten sheets cut from the metalized film to be used for Comparative Example 5 of the metalized film capacitor are measured in the concentrations of Mg. The average of the concentrations of Mg is 4.8%. The standard deviation of the concentrations of Mg is 3.3%. The relative standard deviation of the concentrations is 0.69.

Examples 3 to 5 and Comparative Examples 3 to 5 of the metalized film capacitors are measured in a decreasing rate of the capacitance to evaluate the humidity resistance of the capacitors. In this humidity resistance test, a voltage of 500V is applied to the capacitor for 900 hours at a high temperature of 85° C. in a high humidity of 85% r.h. Then, the decreasing rate of the capacitance of each capacitor is calculated. FIG. 15A shows the evaluation results and the relative standard deviations of the Examples and the Comparative Examples.

As shown in FIG. 15A, Examples 3 to 5 of the metalized film capacitors in accordance with Embodiment 3 exhibit smaller decreasing rate of the capacitances than Comparative Examples 3 to 5.

Figure 16:
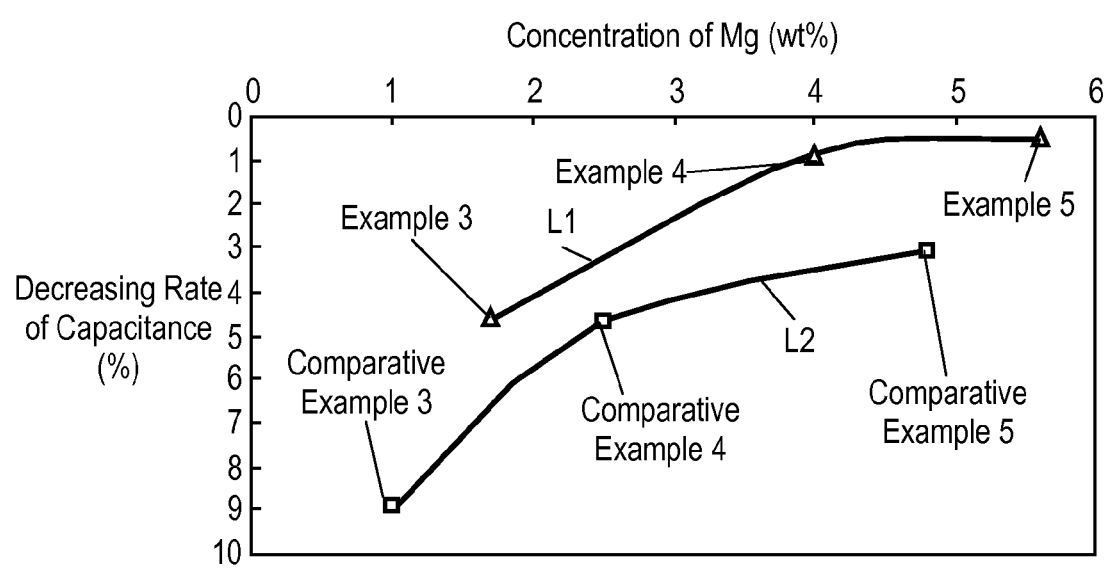
FIG. 16 shows relations between a density of magnesium and a capacitance-decreasing rate of the metalized film capacitor in accordance with Embodiment 3.

FIG. 16 shows the concentration of Mg and the decreasing rate of the capacitance of the metalized film capacitors in accordance with Embodiment 3 shown in FIG. 15A. FIG. 16 illustrates the influence of the relative standard deviation of the concentrations of Mg contained in vapor deposited metal electrodes 4a and 4b on the decreasing rate of the capacitance, i.e., the humidity resistance. In FIG. 16, the vertical axis represents the decreasing rate of the capacitance, and the lateral axis represents the concentration of Mg. The decreasing rates of the capacitances of Examples 3 to 5 are connected with smooth curve L1 while the decreasing rates of the capacitances of Comparative Examples 3 to 5 are connected with smooth curve L2.

As shown in FIG. 16, Examples 3 to 5 of the metalized film capacitors exhibit smaller changing rates of the capacitances with respect to the concentration of Mg than Comparative Examples 3 to 5. This phenomenon is caused by a difference in distribution of magnesium contained in vapor deposited metal electrodes 4a and 4b.

In Comparative Examples 3 to 5 of the metalized film capacitors, magnesium is distributed at an uneven concentration, so that magnesium is distributed locally at a small concentration. Water outside enters firstly into a portion having a small concentration of Mg, and corrodes aluminum in the vapor deposited metal electrode. The corrosion of the aluminum spreads from the portion having the small concentration of Mg, and finally, may disable the vapor deposit metal electrode to function as an electrode. On the other hand, Examples 3 to 5 of the metalized film capacitors have smaller relative standard deviations of magnesium in vapor deposited metal electrodes 4a and 4b, and thus, the deviations are not greater than 2.0, so that unevenness of the concentration of magnesium is reduced. In other words, magnesium is distributed uniformly in vapor deposit electrodes 4a and 4b. Vapor deposit electrodes 4a and 4b has few portions allowing water to enter therein, accordingly preventing the capacitors from reducing the capacitances with time.

As shown in FIG. 16, the humidity resistance of the metalized film capacitor depends on the concentration of magnesium contained in vapor deposit metal electrodes 4a and 4b. Plural samples having different concentrations of magnesium contained in vapor deposited metal electrodes 4a and 4b are prepared, and evaluated in the humidity resistance. The test result shows that a larger concentration of magnesium provides a higher humidity resistance. However, the concentration exceeding 45 wt % prevents vapor deposited metal electrodes 4a and 4b from being formed (by vapor depositing) easily. The concentration of Mg smaller than 0.5 wt % provides little effects. The concentration of magnesium thus preferably ranges from 0.5 wt % to 45 wt %.

Examples 3 to 5 and Comparative Examples 3 to 5 of the metalized film capacitors are evaluated in the humidity resistance at various gradients of a potential. The gradient of the potential is a voltage applied to a unit thickness of insulating films 3a and 3b, and is calculated by dividing a voltage applied between electrodes 4a and 4b via electrodes terminals 6a and 6b by the thickness of insulating films 3a and 3b.

Conventional Example 1 of a metalized film capacitor including vapor deposited metal electrodes made of only aluminum is prepared, and is evaluated in a humidity resistance as a reference. Then, the humidity resistances of Examples 3 to 5 and Comparative Examples 3 to 5 of the metalized film capacitors are compared with the reference. To be more specific, Example 3 and Comparative Example 4 of the metalized film capacitors and are measured in a duration for which the capacitance decreases by 5% at various gradients of potential. Conventional example 1 of the metalized film capacitor including the vapor deposited metal electrodes made of only aluminum is measured also in a duration which is the reference for which the capacitance decreases by 5% at various gradients of potential.

FIG. 15B shows the humidity resistance test result of the metalized film capacitor in accordance with Embodiment 3. The humidity resistance test is performed with respect to the gradients of potential of the capacitor. The test result shows the ratio of the duration of Example 3 to that of the reference, and the ratio of the duration of Comparative Example 4 to that of the reference. Example 3 of the capacitor has the average of the concentrations of Mg of 1.7 and the relative standard deviation of 0.2 while Comparative Example 4 of the capacitor has the average of the concentrations of Mg of 2.5 and the relative standard deviation of 2.77.

As shown in FIG. 15B, as the gradient of potential increases, the duration of Comparative Example 4 decreases, and accordingly reduces the humidity resistance. In other words, the increasing of the gradient of potential allows the humidity resistance of Comparative Example 4 to approach that of the metalized film capacitor having the vapor deposited metal electrodes made of only aluminum.

On the other hand, Example 3 of the metalized film capacitor exhibits little change in the duration even if the gradient of potential increases, thus not reducing the humidity resistance. In other words, Example 3 of the capacitor exhibits sufficient advantage of the humidity resistance over the capacitor having the vapor deposited metal electrodes made of only aluminum only.

In the case that the same voltage is applied to insulating films with different thickness, the gradient of potential increases as the thicknesses of the insulating films decreases. This fact and the foregoing test result show that Example 3 of the metalized film capacitor can exhibit sufficient humidity resistance even if the capacitor includes a thin insulating film.

In other words, Example 3 of the metalized film capacitor can exhibit sufficient humidity resistance when the voltage gradient per unit thickness of insulating films 3a and 3b is not smaller than 150 V/μm. This is thus useful for a metalized film capacitor including thin insulating film 3a and 3b and having a small size.

Embodiment 3 is not limited by the examples discussed above, but it can be carried out with various changes. For instance, the foregoing examples include vapor deposited metal electrodes 4a and 4b of metalized films 1 and 2, and the relative standard deviation of the concentration of magnesium contained in both electrodes 4a and 4b is not larger than 2.0; however, it is not necessarily to maintain this structure, and the foregoing relative standard deviation can be applied to either one of the electrodes 4a and 4b, thereby providing the same effects.

In the metalized film capacitor in accordance with Embodiment 3, metalized films 1 and 2 are rolled about center axis 1001P; however, the structure is not limited to this one, and plural metalized films 1 and plural metalized films 2 are stacked alternately to form a layered type metalized film capacitor, and the density of magnesium used in Embodiment 3 can be applied to this layered type capacitor, providing the same effects.

Exemplary Embodiment 4

A metalized film capacitor in accordance with Exemplary Embodiment 4 has the same structure as metalized film capacitor 1002 in accordance with Embodiment 2 shown in FIGS. 10 and 11.

Figure 17A:
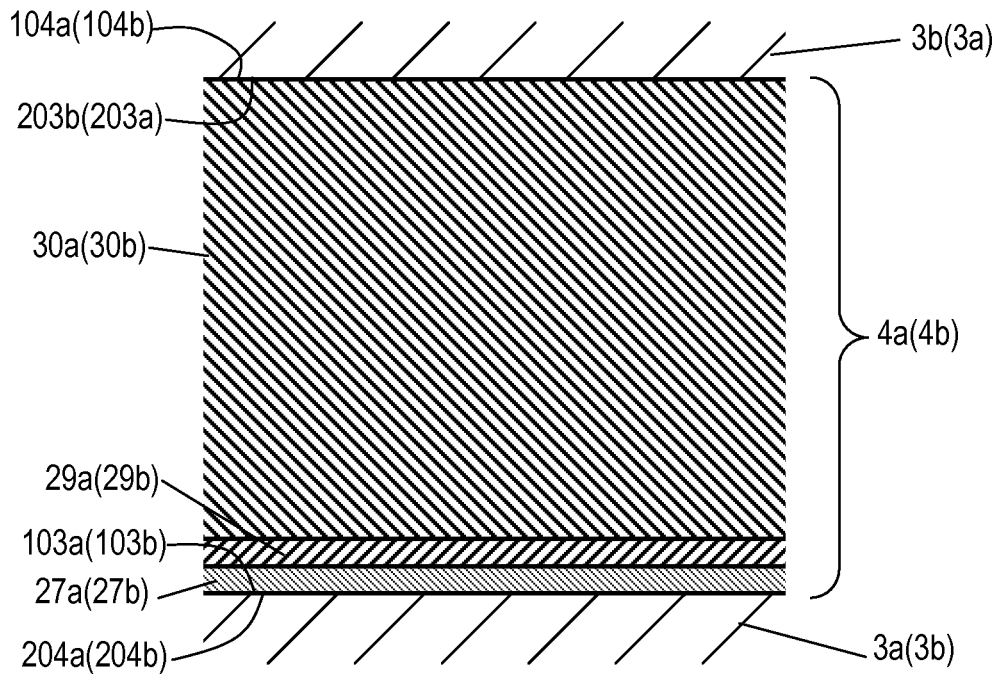
FIG. 17A is an enlarged sectional view of a vapor deposited metal electrode of a metalized film capacitor in accordance with Exemplary Embodiment 4 of the invention.

FIG. 17A is an enlarged sectional view of vapor deposited metal electrodes 4a (4b) of the metalized film capacitor in accordance with Embodiment 4. In the metalized film capacitor in accordance with Embodiment 4, at least one of electrodes 4a and 4b is mainly made of aluminum, and includes oxide film 27a (27b) provided at lower surface 204a (204b) joined to upper surface 103a (103b) of insulating film 3a (3b), magnesium-containing layer 29a (29b) provided on an upper surface of oxide film 27a (27b), and core layer 30a (30b) provided on an upper surface of magnesium-containing layer 29a (29b). Core layer 30a (30b) is provided at upper surface 104a (104b) of vapor deposited metal electrode 4a (4b) joined to lower surface 203b (203a) of insulating film 3b (3a). Magnesium-containing layers 29a and 29b contain magnesium not as an oxide but as metal. Core layer 30a (30b) is made of aluminum. The atomic percentage of magnesium in electrode 4a (4b) becomes maximum at magnesium-containing layer 29a, 29b. The concentration of magnesium in electrodes 4a and 4b per unit area along upper surfaces 104a, 104b ranges from 2.0 wt % to 40 wt %. More than a predetermined amount of magnesium allows the metal magnesium in magnesium-containing layers 29a, 29b to remain while natural oxidation progresses in the magnesium. An excessive amount of magnesium increases a resistance of the electrodes, and thus, the foregoing range is desirable.

Figure 17B:
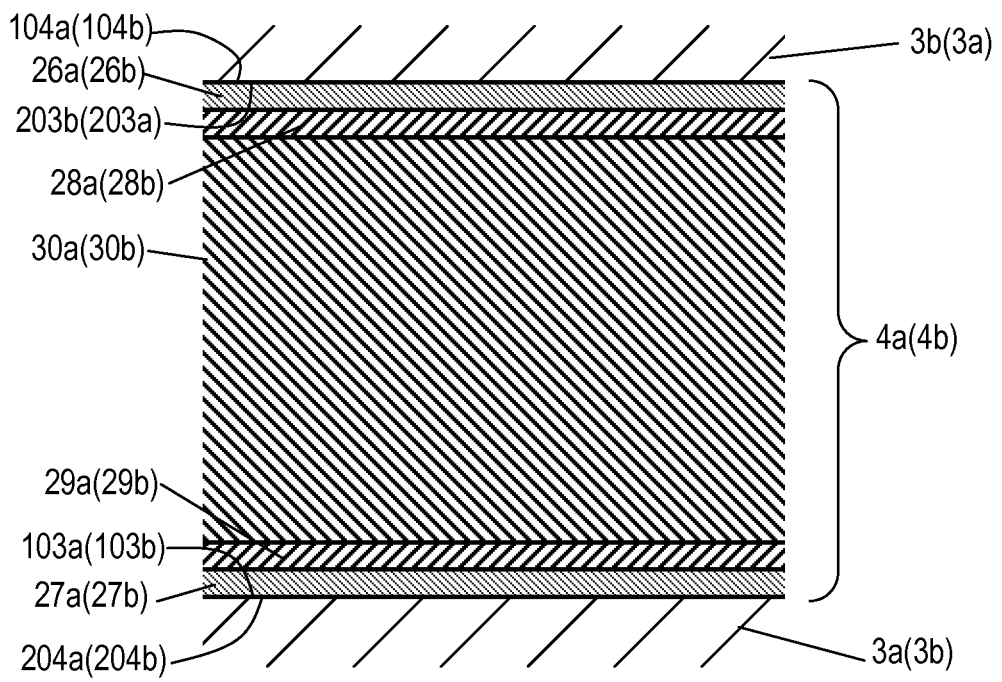
FIG. 17B is an enlarged sectional view of another vapor deposited metal electrode of a metalized film capacitor in accordance with Embodiment 4.

FIG. 17B is an enlarged sectional view of another vapor deposited metal electrodes 4a (4b) of the metalized film capacitor in accordance with Embodiment 4. At least one of electrodes 4a and 4b is mainly made of aluminum, and includes oxide film 27a (27b) provided at lower surface 204a (204b) joined to upper surface 103a (103b) of insulating film 3a (3b), magnesium-containing layer 29a (29b) provided on an upper surface of oxide film 27a (27b), core layer 30a (30b)

provided on an upper surface of magnesium-containing layer 29a (29b), magnesium-containing layer 28a (28b) provided on an upper surface of core layer 30a (30b), and oxide film 26a (26b) provided on an upper surface of magnesium-containing layer 28a (28b). In other words, oxide film 26a (26b) is provided at upper surface 104a (104b) of vapor deposited metal electrode 4a (4b) joined to lower surface 203b (203a) of insulating film 3b (3a). Magnesium-containing layers 28a, 28b, 29a, and contain magnesium not as an oxide but as metal. Core layer 30a (30b) is made of aluminum. The atomic percentage of magnesium in vapor deposited metal electrode 4a (4b) becomes maximum at magnesium-containing layer 28a, 28b, 29a, and 29b. The concentration of magnesium in vapor deposited metal electrodes 4a, 4b per unit area along upper surfaces 104a and 104b ranges from 2.0 wt % to 40 wt %. More than a predetermined amount of magnesium allows the metal magnesium in magnesium-containing layers 28a, 28b, 29a, and 29b to remain while natural oxidation progresses in the magnesium. An excessive amount of magnesium increases a resistance of the vapor deposited metal layers, and thus, the foregoing range is desirable.

Example 6

In Example 6 of the metalized film capacitor, vapor deposited metal electrode 4a functioning as a positive electrode and vapor deposited metal electrode 4b functioning as a negative electrode are made of Al—Mg alloy. Both the electrodes have the structure shown in FIG. 17A. Insulating film 3a and vapor deposited metal electrode 4a of metalized film 1 of Example 6 are made of the same materials by the same method as insulating film 3b and electrode 4b of metalized film 2. Metalized films 1 and 2 thus commonly have the characteristics of the metalized film of Example 6 discussed below.

The vapor deposited metal electrodes of Example 6 contain 4.9 wt % of magnesium per unit area while core layers 30a, 30b are made of aluminum.

Figure 18A:
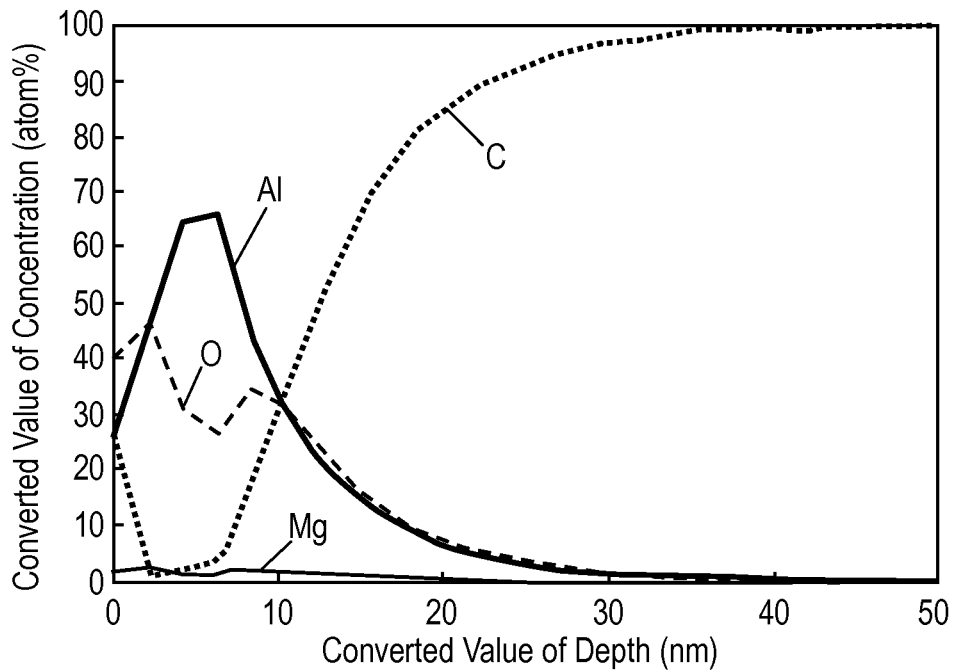
FIG. 18A shows composition of a vapor deposited metal electrode of the metalized film capacitor in accordance with Embodiment 4.
Figure 18B:
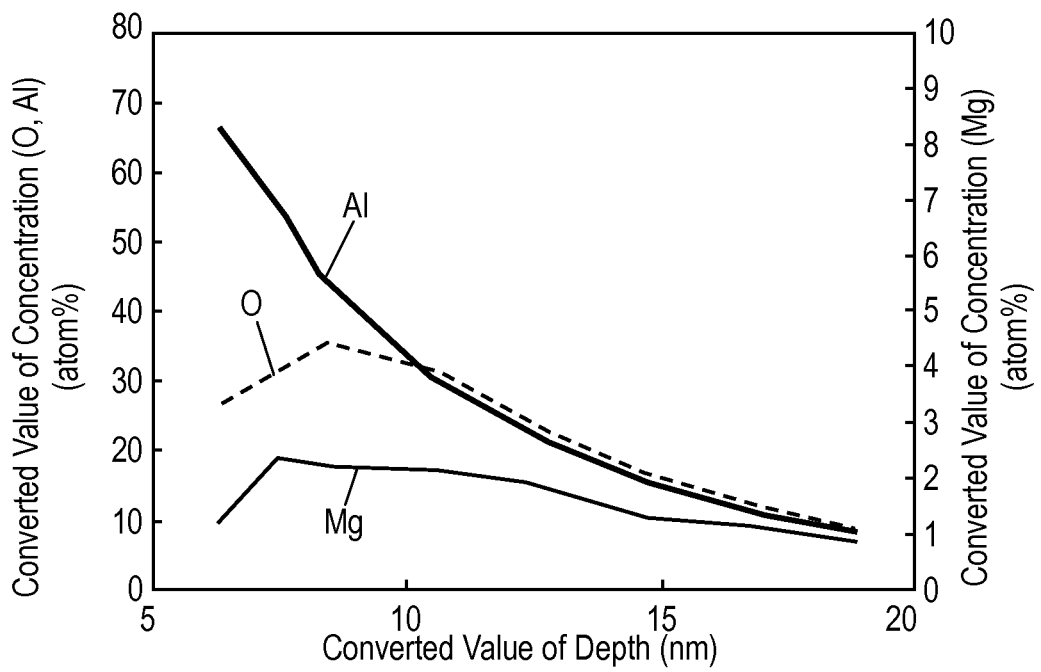
FIG. 18B shows composition of vapor deposited metal electrodes in accordance with Embodiment 4.

FIGS. 18A and 18B show relations between a converted value of a depth (distance) from the surfaces of vapor deposited metal electrodes 4a and 4b and the atomic percentages obtained from result of analysis of X-ray photoelectron spectroscopy (XPS). In FIG. 18A, the lateral axis represents the converted value of (nm) of the depth (distance) from surfaces (upper surfaces 104a and 104b) of vapor deposited metal electrodes 4a and 4b, and the vertical axis represents atomic percentages (atom %). In FIG. 18B, the lateral axis represents converted value (nm) of the depth (distance) from surfaces (upper surface 104a and 104b) of vapor deposited metal electrodes 4a and 4b. The left vertical axis represents the atomic percentages (atom %) of Al and O (oxygen), and the right side vertical axis represents the atomic percentage (atom %) of Mg. The converted values of the depth can be calculated by comparing a sputtering rate of silicon dioxide film with that of aluminum under the same condition. As shown in FIG. 18B, in vapor deposited metal electrodes 4a and 4b of Example 6, a position exhibiting the maximum value of the concentration of Mg is deeper than a position exhibiting the maximum concentration of Al. In other words, magnesium exists under core layer 30a (30b) made of aluminum. A position exhibiting a peek concentration of O (oxygen) is deeper than the position exhibiting the maximum concentration of Mg.

Figure 19:
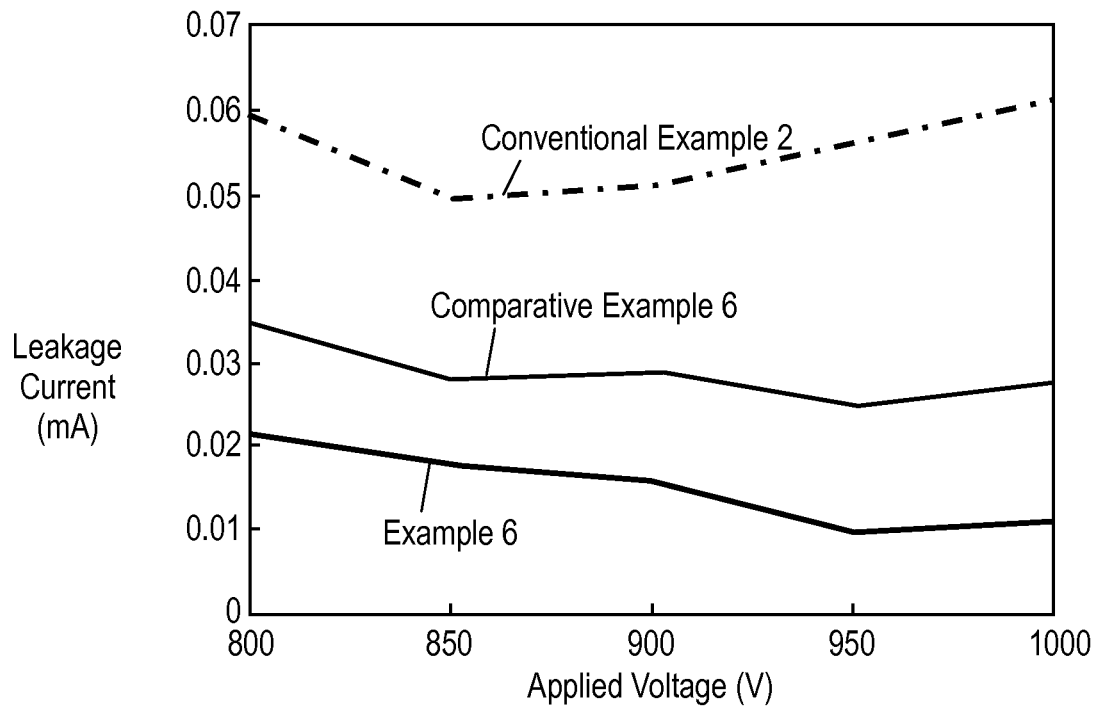
FIG. 19 shows a leakage current of the metalized film capacitor in accordance with Embodiment 4.

FIG. 19 shows a relation between an applied voltage and a leakage current at a high temperature, 100° C. A vapor deposited metal electrode of Conventional Example 2 of a metalized film capacitor includes only an aluminum layer. A vapor deposited metal electrode of Comparative Example 6 the metalized film capacitor does not include a magnesium-containing layer, and includes an oxide film made of magnesium oxide under a core layer made of aluminum. In Comparative Example 6, the vapor deposited metal electrode contains less than 2.0 wt % of magnesium per unit area.

As shown in FIG. 19, the leakage current becomes smaller in the order of Conventional Example 2, Comparative Example 6, and Example 6. This order is caused by the decreasing of water contained in insulating films 3a and 3b due to the bonding of a part of magnesium layer provided under the core layer made of aluminum to the water contained in insulating films 3a and 3b. The leakage current under the core layer made of aluminum decreases as the concentration of magnesium increases.

The above results provides an estimation that an oxide film of Mg is provided at upper surface 104a (104b) and lower surface 204a (204b) of vapor deposited metal electrode 4a (4b) joined to insulating film 3a (3b). In Example 6, oxide films 27a and 27b are made of magnesium oxide; however, oxide films 27a and 27b may be made of another metal oxide, and can prevent magnesium-containing layers 29a and 29b containing magnesium metal from being oxidized. Oxide films 27a and 27b may be made of, e.g. aluminum oxide, titanium oxide, silicon oxide, or manganese oxide.

Figure 20:
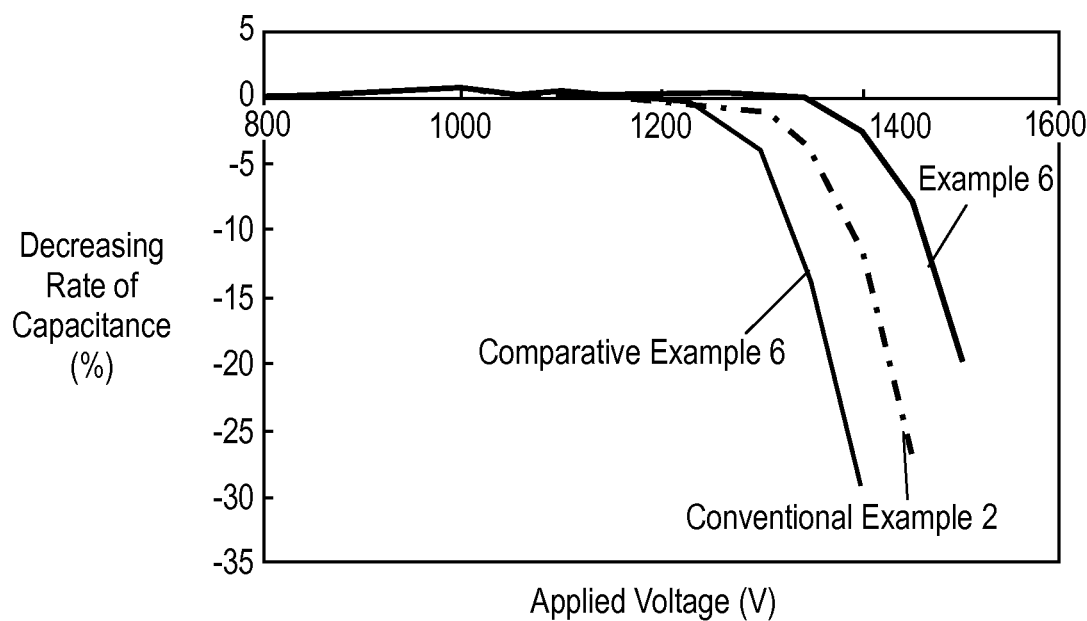
FIG. 20 shows a withstanding voltage of the metalized film capacitor in accordance with Embodiment 4.
Figure 21:
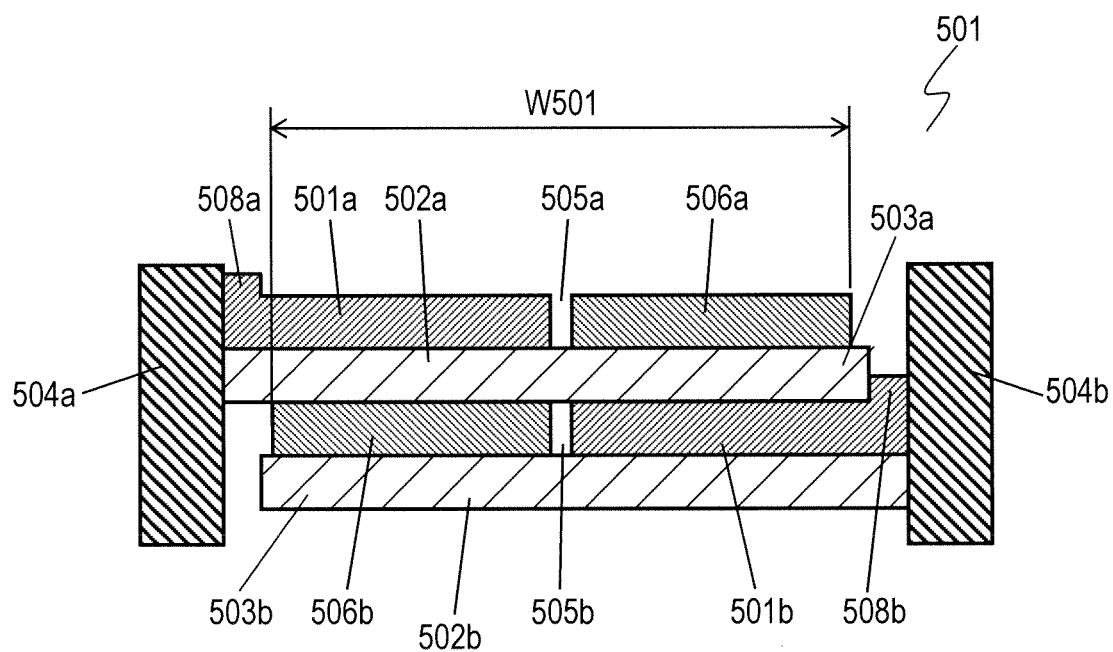
FIG. 21 is a sectional view of a conventional metalized film capacitor.
Figure 22:
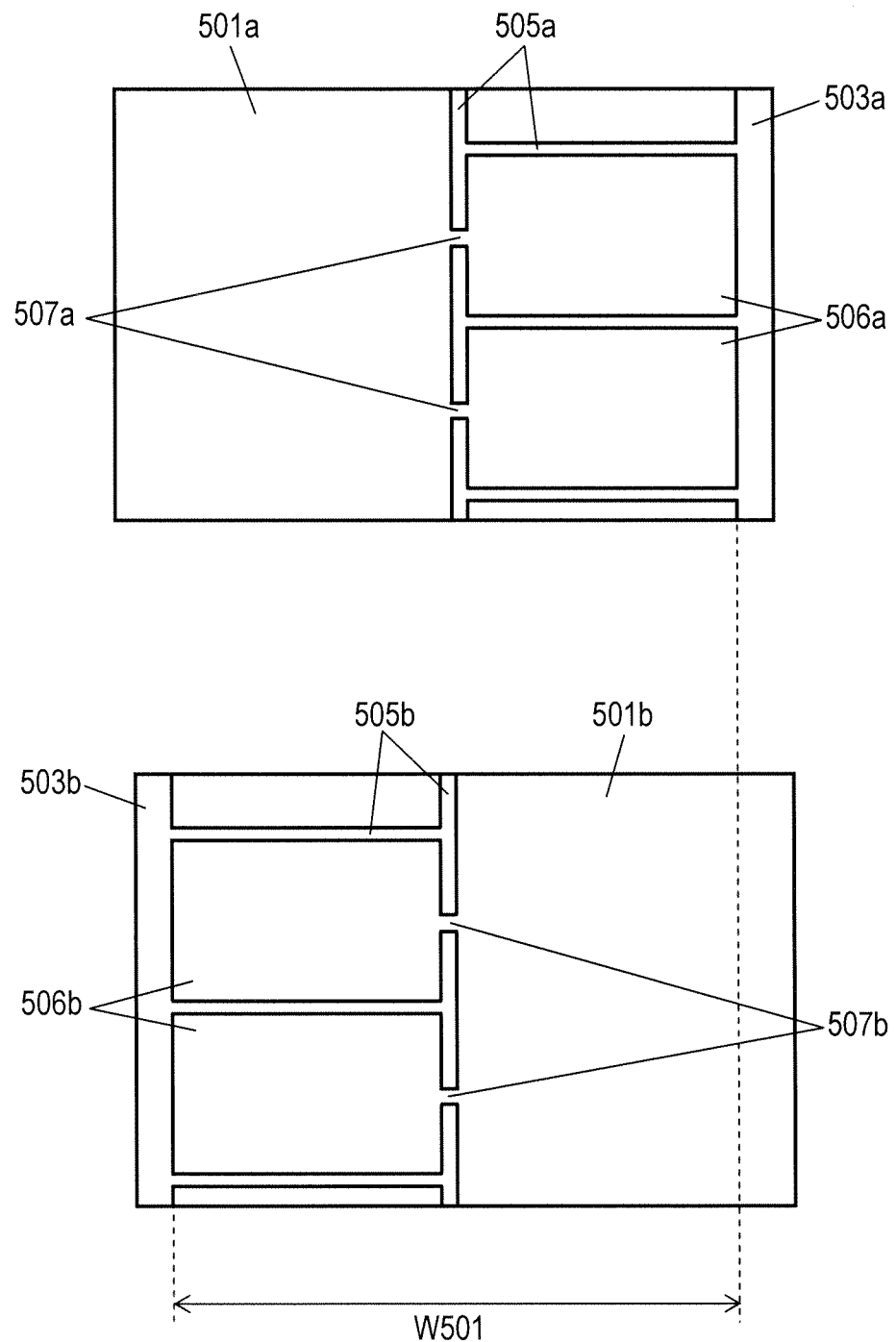
FIG. 22 is a plan view of a metalized film of the conventional metalized film capacitor.

FIG. 20 shows the result of a short-time withstanding voltage test performed to Example 6, Conventional Example 2, and Comparative Example 6 of the metalized film capacitors. In the short-time withstanding voltage test, a voltage applied between the metalized films of each capacitor is raised by a predetermined amount at predetermined intervals at a temperature of 100° C. The voltage causing the changing rate of the capacitance of each capacitor to reach −5% is measured as a withstanding voltage providing the capacitor with evaluation for a withstanding voltage property. The changing rate (%) of the withstanding voltage of Example 6 is calculated by the procedure that a difference obtained by subtracting withstanding voltage V0 of Conventional Example 2 from withstanding voltage Vt of Example 6 is divided by withstanding voltage V0. Similarly, the changing rate (%) of the withstanding voltage of Comparative Example 6 is calculated by the procedure that a difference obtained by subtracting withstanding voltage V0 of Conventional Example 2 from withstanding voltage Vt of Comparative Example 6 is divided by withstanding voltage V0.

The withstanding voltage of the metalized film capacitor including Conventional Example 2 of the metalized film is 1359 V while that of Example 6 is 1426 V. The changing rate of the withstanding voltage of Example 6 from Conventional Example 2 is 4.9%. The withstanding voltage of Comparative Example 6 is 1334 V, and the change rate of withstanding voltage of Comparative Example 6 from Conventional Example 2 is −1.8%. Example 6 thus exhibits better withstanding voltage properties than Comparative Example 6.

A reason of this improvement will be described below. Magnesium needs smaller clearing energy for scattering, so that magnesium has a higher self-healing property than aluminum. Magnesium causes the self-healing function easily at the surfaces joined to insulating films 3a and 3b, accordingly increasing the withstanding voltage. Since magnesium reacts with water faster than aluminum, magnesium is subjected to natural oxidation due to water contained in air. Oxide films 27a and 27b provided on the lower surfaces of magnesium-containing layers 29a and 29b prevent magnesium-containing layers 29a and 29b from being oxidized. Since oxide films 27a and 27b have a small thickness ranging from 0.1 nm to 15 nm and are made of insulating material, oxide films 27a and 27b does not adversely affect the self-healing property.

Magnesium-containing layers 29a and 29b and oxide films 27a and 27b can be included in either one of vapor deposit metal electrode 4a and 4b, or in both of the vapor deposit metal electrodes.

In Example 6, magnesium-containing layers 29a and 29b have a thickness not larger than a half of the thickness of vapor deposited metal electrodes 4a and 4b. Since aluminum has a smaller specific resistance than magnesium, core layer 30a (30b) made of aluminum having a large thickness, e.g. the thickness larger than a half of the thickness of electrode 4a (4b), reduces the resistance of the electrodes. Magnesium-containing layers 28a (28b) and oxide film 26a (26b) shown in FIG. 17B are made of the same materials as magnesium-containing layers 29a (29b) and oxide films 27a (27b), respectively, providing the same effects.

In the Embodiments, terms, such as "upper surface" and "lower surface" indicating directions merely indicate relative directions depending on a relative positional relation of structural components, such as insulating films, vapor deposited metal electrodes, electrode terminals, of the metalized film capacitor, and do not indicate absolute directions, such as a vertical direction.

INDUSTRIAL APPLICABILITY

A metalized film capacitor according to the present invention is excellent in humidity resistance, and is useful for the capacitor to be used in various electronic devices, electric apparatuses, industrial equipment, automobiles, particularly for automobile application that requires high humidity resistance and high withstanding voltage properties.

REFERENCE MARKS IN THE DRAWINGS

1 Metalized Film
2 Metalized Film
3a Insulating Film
3b Insulating Film
4a Vapor Deposited Metal Electrode (First Electrode)
4b Vapor Deposited Metal Electrode (Second Electrode)
6a Electrode Terminal (First Electrode Terminal)
6b Electrode Terminal (Second Electrode Terminal)
13a Low Resistance Section
17a Center Region

The invention claimed is:

1. A metalized film capacitor comprising:
a metalized film including an insulating film made of dielectric material, a first electrode that is a vapor deposited metal electrode disposed on an upper surface of the insulating film;
a second electrode disposed on a lower surface of the insulating film, the second electrode facing the first electrode across the insulating film;
a first electrode terminal connected to the first electrode; and
a second electrode terminal connected to the second electrode,
wherein an end of the first electrode and an end of the insulating film extends to be connected to the first electrode terminal,
wherein the first electrode includes:
a center region away from the end of the first electrode and faces the second electrode across the insulating film; and
a low resistance section made of an Al—Zn—Mg alloy disposed at the end of the first electrode, the low resistance section being thicker than the center region, and
wherein the low resistance section contains Mg, and a peak of the atomic percentage of the Mg is located a range not greater than 5 nm from a surface of the low resistance section.

2. A metalized film capacitor comprising:
a metalized film including an insulating film made of dielectric material, a first electrode that is a vapor deposited metal electrode disposed on an upper surface of the insulating film;
a second electrode disposed on a lower surface of the insulating film, the second electrode facing the first electrode across the insulating film;
a first electrode terminal connected to the first electrode; and
a second electrode terminal connected to the second electrode,
wherein an end of the first electrode and an end of the insulating film extends to be connected to the first electrode terminal,
wherein the first electrode includes:
a center region away from the end of the first electrode and faces the second electrode across the insulating film; and
a low resistance section made of Al—Zn—Mg alloy disposed at the end of the first electrode, the low resistance section being thicker than the center region, and
wherein the atomic percentage of the Mg contained in the low resistance section is lower than an atomic percentage of the Mg contained in the center region.

* * * * *